(12) United States Patent
Pejsa et al.

(10) Patent No.: US 11,854,152 B2
(45) Date of Patent: *Dec. 26, 2023

(54) PRIVACY PRESERVING EXPRESSION GENERATION FOR AUGMENTED OR VIRTUAL REALITY CLIENT APPLICATIONS

(71) Applicant: Magic Leap, Inc., Plantation, FL (US)

(72) Inventors: Tomislav Pejsa, Sunnyvale, CA (US); Dushan Vasilevski, Oberglatt (CH); Victor Ng-Thow-Hing, Los Altos, CA (US); Koichi Mori, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,307

(22) Filed: Jan. 30, 2023

(65) Prior Publication Data

US 2023/0177785 A1 Jun. 8, 2023

Related U.S. Application Data

(63) Continuation of application No. 17/316,424, filed on May 10, 2021, now Pat. No. 11,568,610.

(Continued)

(51) Int. Cl.
*G06T 19/00* (2011.01)
*G06F 3/01* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 10,404,750 B2 * 9/2019 Bharali ................... H04L 63/20
10,852,547 B2 12/2020 Bhargava et al.
(Continued)

OTHER PUBLICATIONS

Suman Jana, David Molnar, Alexandra Moshchuk, Alan Dunn, Benjamin Livshits, Helen J Wang, Eyal Ofek, "Enabling Fine-Grained Permissions for Augmented Reality Applications with Recognizers," 2013, Proceedings of the 22nd USENIX Security Symposium, pp. 415-430 (Year: 2013).*

*Primary Examiner* — Michael J Cobb
(74) *Attorney, Agent, or Firm* — Fish & Richardson P.C.

(57) ABSTRACT

Wearable systems for privacy preserving expression generation for augmented or virtual reality client applications. An example method includes receiving, by an expression manager configured to communicate expression information to client applications, a request from a client application for access to the expression information. The expression information reflects information derived from one or more sensors of the wearable system, with the client application being configured to present virtual content including an avatar rendered based on the expression information. A user interface is output for presentation which requests user authorization for the client application to access the expression information. In response to receiving user input indicating user authorization, enabling access to the expression information is enabled. The client application obtains periodic updates to the expression information, and the avatar is rendered based on the periodic updates.

19 Claims, 20 Drawing Sheets

Related U.S. Application Data

(60) Provisional application No. 63/023,719, filed on May 12, 2020.

(51) Int. Cl.

| | | |
|---|---|---|
| *G06F 21/31* | (2013.01) | |
| *G06F 21/62* | (2013.01) | |
| *G06N 5/04* | (2023.01) | |
| *G02B 27/01* | (2006.01) | |
| *G02B 27/00* | (2006.01) | |
| *G06T 13/40* | (2011.01) | |

(52) U.S. Cl.
CPC .............. *G06F 3/011* (2013.01); *G06F 21/31* (2013.01); *G06F 21/6245* (2013.01); *G06N 5/04* (2013.01); *G06T 13/40* (2013.01)

(56) References Cited

U.S. PATENT DOCUMENTS

| | | |
|---|---|---|
| 11,017,592 B2 * | 5/2021 | Babu J D .............. G06T 17/005 |
| 11,113,859 B1 * | 9/2021 | Xiao ..................... G06T 15/005 |
| 11,199,912 B2 | 12/2021 | Schliemann et al. |
| 11,334,154 B2 | 5/2022 | Cohen |
| 2009/0241039 A1 | 9/2009 | Estevez et al. |
| 2014/0267413 A1 | 9/2014 | Du et al. |
| 2015/0016777 A1 | 1/2015 | Abovitz et al. |
| 2015/0071555 A1 * | 3/2015 | D'Antoni ............... G06V 20/20 382/209 |
| 2016/0086088 A1 | 3/2016 | Yehezkel et al. |
| 2016/0270656 A1 | 9/2016 | Samec et al. |
| 2017/0160813 A1 | 6/2017 | Divakaran et al. |
| 2019/0057714 A1 * | 2/2019 | Scholar ................. G10L 15/187 |
| 2019/0279410 A1 * | 9/2019 | Orvalho ................. G06F 3/012 |
| 2019/0285881 A1 | 9/2019 | Ilic et al. |
| 2020/0219300 A1 | 7/2020 | Ishikawa et al. |
| 2021/0241510 A1 * | 8/2021 | Kuribayashi ........... G06F 3/011 |

* cited by examiner

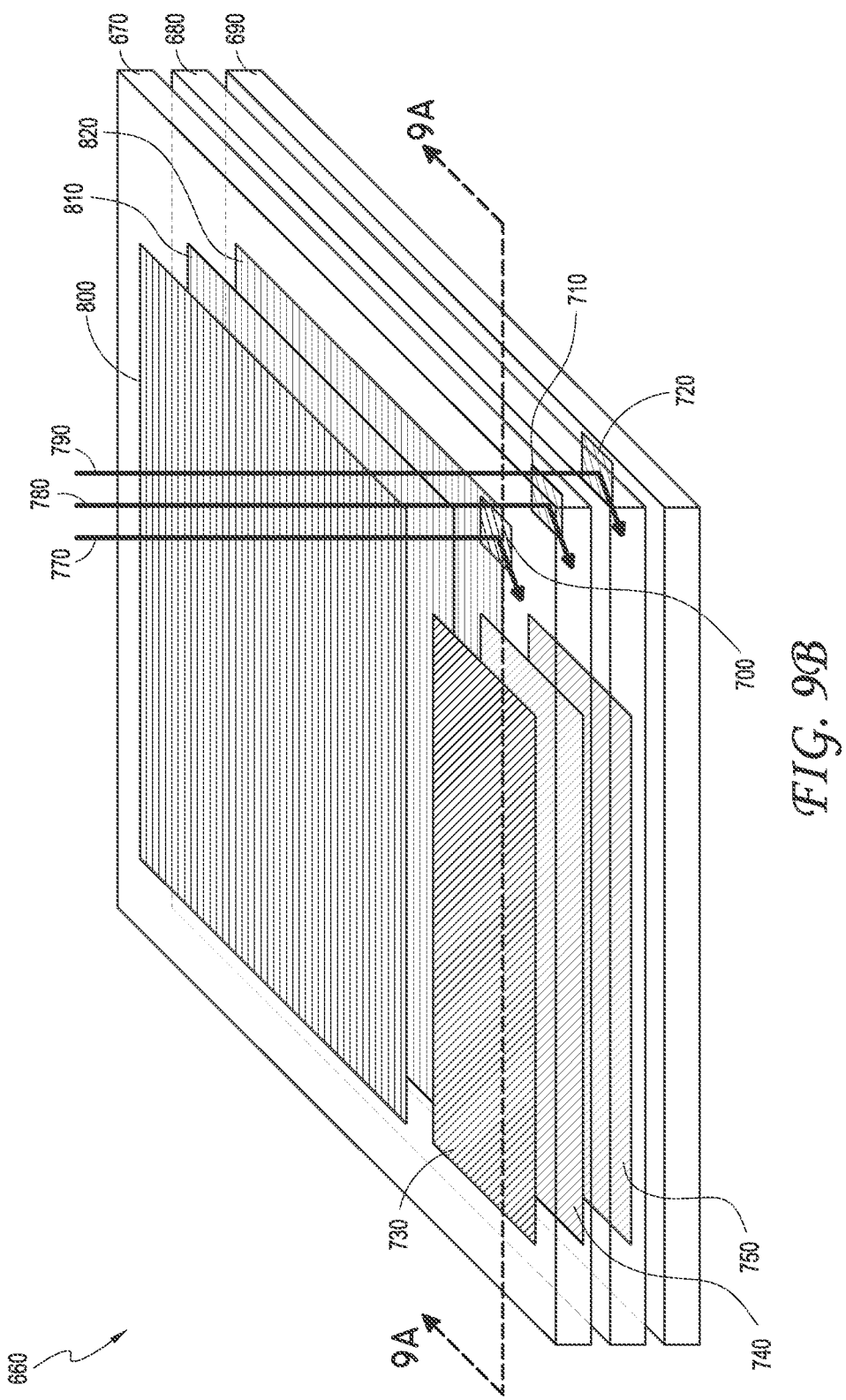

PRIVACY PRESERVING EXPRESSION GENERATION FOR AUGMENTED OR VIRTUAL REALITY CLIENT APPLICATIONS

INCORPORATION BY REFERENCE

This application is a continuation of U.S. patent application Ser. No. 17/316,424, filed on May 10, 2021, and titled PRIVACY PRESERVING EXPRESSION GENERATION FOR AUGMENTED OR VIRTUAL REALITY CLIENT APPLICATIONS, which claims priority to U.S. Prov. Patent App. No. 63/023,719 filed on May 12, 2020 and titled "PRIVACY PRESERVING EXPRESSION GENERATION FOR AUGMENTED OR VIRTUAL REALITY CLIENT APPLICATIONS," the disclosure of which are hereby incorporated herein by reference in their entirety.

This application further incorporates by reference the entireties of each of the following: U.S. patent application Ser. No. 16/692,751; U.S. Patent Publication No. 2016/0270656; U.S. Patent Publication No. 2015/0016777; U.S. patent application Ser. No. 16/751,076.

BACKGROUND

Field

The present disclosure relates to display systems and, more particularly, to augmented and virtual reality systems and devices.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an AR scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

This specification describes techniques to enable generation of realistic avatars by augmented or virtual reality applications (herein referred to as 'client applications'). As will be described, an augmented or virtual reality wearable system may execute a client application. An example wearable system may include a display device worn by a user, such as the wearable system illustrated in FIG. 9E. The client application may include functionality to render virtual content to a user of the wearable system. The virtual content may be presented such that it is perceived to be positioned in the real-world to the user. Example virtual content may include an avatar generated by the client application based on real-world information associated with the user. As an example, a face of the avatar may be generated such that the avatar's eyes follow a gaze of the user. As another example, the arms of the avatar may be generated such that the avatar's arms follow arm movements of the user.

In some embodiments a method implemented by an augmented or virtual reality display device of one or more processors is disclosed. The method includes receiving a request from a client application for access to expression information, the expression information reflecting information derived from sensors of the display device, wherein the client application is configured to present virtual content comprising an avatar rendered based on the expression information; outputting, for presentation, a user interface requesting user authorization for the client application to access the expression information; and in response to receiving user input indicating user authorization, enabling access to the expression information, wherein the client application obtains periodic updates to the expression information, and wherein the avatar is rendered based on the periodic updates.

The above embodiments may include one or more of the following. The expression information is generated using a plurality of inference models. Each inference model derives information from a respective subset of the sensors. A first inference model of the plurality of inference models derives a pose associated with a head of the user. The first inference model further derives position and orientation of a root of the user based on the pose. The root is indicative of a pelvis of the user. Deriving the position and orientation of the root is based on a spring damper model. The first inference model derives information from one or more inertial measurement units of the display device. A second inference model of the plurality of inference models derives a fixation point, the fixation point indicating a three-dimensional location within a real-world at which the user is fixating. The second inference model further derives information indicating eyelid openness of the user. The second inference model derives information from one or more imaging sensors of the display device, the imaging sensors pointing towards the user. A third inference model of the plurality of inference models derives position and orientation of one or more of the user's hands. The third inference model further derives pose information associated with digits of the user's hands. The third inference model further derives information based on one or more imaging sensors pointing outwards from the display device and one or more input devices configured to be held by the hands of the user, each input device comprising an inertial measurement unit. A fourth inference model of the plurality of inference models derives phoneme information associated with speech of the user. The phoneme information comprises phoneme weights for a plurality of phonemes. The fourth inference model derives information from one or more microphones of the display device. Access to the expression information by the client application is constrained until receipt of user authorization, and wherein no access to information from the sensors is granted to the client application. The expression information is configured to be mapped to rig controls of the avatar. The expression information reflects one or more of blend shapes, phoneme weights, hand position and orientation information, eye-lid openness, fixation point, hand pose information, audio amplitude associated with speech from the user. The expression information is generated at a first update frequency and wherein the client application obtains expression information at a second update frequency, wherein the first update frequency is less than the second update frequency. An expression buffer of the display device stores respective values of expression information generated at a threshold number of timestamps. The expression buffer is a delay buffer, and wherein updating the expression buffer comprises: generating, for a particular timestamp, values of expression information derived from the sensors of the display device; assigning the particular timestamp as being the addition of a particular delay with the particular timestamp; and storing the generated values as being associated with the particular timestamp. The client application obtains values of expression information at a particular timestamp, and wherein obtaining values comprises: identifying a first timestamp of the threshold number of timestamps which is earlier than the particular timestamp; identifying a second timestamp of the threshold number of timestamps which is later than the particular timestamp; and interpolating between values of the first timestamp and second timestamp. The user interface includes a textual description of the expression information. The user interface presents virtual content comprising an avatar rendered based on the expression information, wherein portions of the avatar are highlighted and a textual description of the associated expression information is presented. Enabling access comprises: registering the client application with an expression manager configured to output the expression information. The registering the client application comprises the client application subscribing to updates from the expression manager. A plurality of client applications are registered with the expression manager, and wherein each of the client applications obtains periodic updates from the expression manager, such that each client application is configured to render respective avatars based on obtained expression information.

In some embodiments, a display system configured to present augmented or virtual reality content is disclosed. The display system comprises: one or more processors configured to: execute a plurality of client applications, wherein each client application is associated with one or more user processes, and wherein each client application is configured to present virtual content comprising an avatar rendered based on movement of a user of the display system; update, via an expression manager, expression information at a first update rate, the expression information being stored in an expression buffer which comprises respective values of expression information for a threshold number of timestamps, wherein expression information reflects information derived from sensors of the display system; and enable, based on user authorization, the client applications to obtain expression information from the expression buffer, wherein the client applications obtain expression information at a second update rate, the second update rate being greater than the first update rate, and wherein the client applications render respective avatars based on the obtained expression information.

The above embodiments may include one or more of the following. The expression information is generated using a plurality of inference models, and wherein each inference model uses a subset of the sensors of the display system. The sensors comprise one or more of imaging sensors, inertial measurement units, and audio sensors. The expression buffer is a delay buffer, such that for values of expression information generated at a first timestamp, the values are stored in the expression buffer as being associated with the first timestamp plus a delay. Client applications are constrained until receipt of user authorization, and wherein no access to information from the sensors is granted to the client applications. The client applications interpolate expression information obtained from the expression buffer, such that animation of respective avatars is smooth. The first update rate is adjustable by the display system based on a current computational load of the display system.

In some embodiments, non-transitory computer storage media storing instructions for execution by a display system of one or more processors is disclosed. The instructions cause the processors: execute a plurality of client applications, wherein each client application is associated with one or more user processes, and wherein each client application is configured to present virtual content comprising an avatar rendered based on movement of a user of the wearable system; update, via an expression manager, expression information at a first update rate, the expression information being stored in an expression buffer which comprises respective values of expression information for a threshold number of timestamps, wherein expression information reflects information derived from sensors of the wearable system; and enable, based on user authorization, the client applications to obtain expression information from the expression buffer, wherein the client applications obtain expression information at a second update rate, the second update rate being greater than the first update rate, and wherein the client applications render respective avatars based on the obtained expression information.

BRIEF DESCRIPTION OF THE DRAWINGS

FIG. 9B illustrates a perspective view of an example of the plurality of stacked waveguides of FIG. 9A.

DETAILED DESCRIPTION

Figure 1:
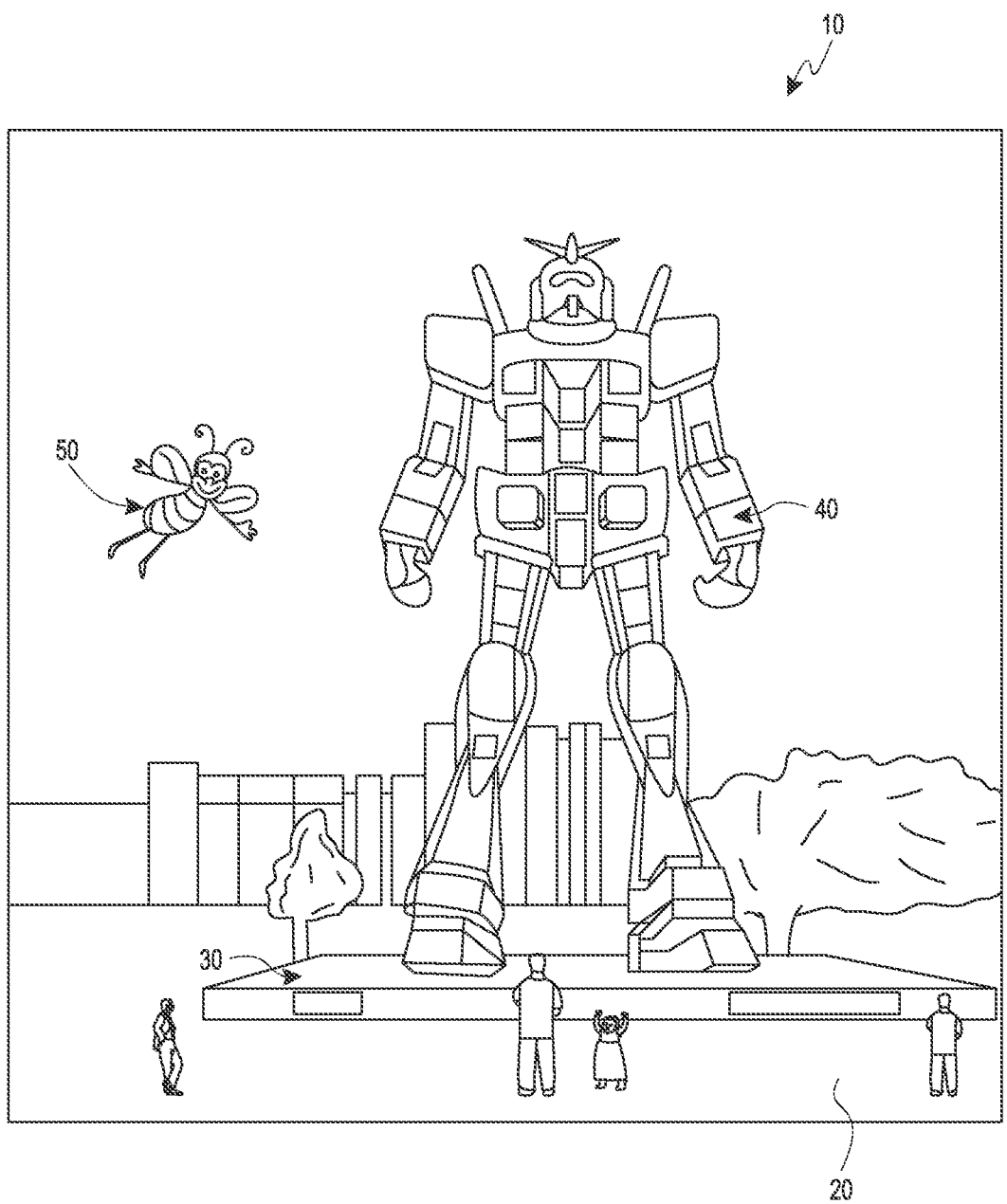
FIG. 1 illustrates a user's view of augmented reality (AR) through an AR device.

As described herein, an augmented or virtual reality wearable system may execute a client application configured to render an avatar. For example, the avatar may be rendered to track movement of the user of the wearable system in substantially real-time. In this way, the client application may effectuate functionality such as augmented or virtual reality games, social applications (e.g., chat or video communication applications), and so on. The user of the wearable system may obtain (e.g., download) multitudes of client applications for use on his/her wearable system. These different client applications may similarly render avatars for presentation by the wearable system. Without the techniques described herein, these client applications may consume substantial processing resources generating avatars. Additionally, these client applications may have access to sensitive information of the user. For example, to render mouth movements of an avatar which correspond to mouth movements of the user, a client application may require access to audio (e.g., speech) of the user.

Described herein are techniques to allow for client applications to generate avatars, while reducing required computational resources and ensuring privacy of the user. As will be described, the wearable system may include system or platform-level functionality to generate expression information. This expression information may include information usable to update avatars being rendered by client application. For example, the expression information may be derived from sensor information and reflect phoneme weights, blend shapes, hand position information, and so on. Client applications may subscribe to updates from this platform-level functionality and receive the expression information for use in rendering avatars. For example, an application programming interface (API) may be used.

Advantageously, sensitive information of the user may therefore be masked from the client applications. As an example, the client applications may update mouth movements of respective avatars based on the phoneme weights included in expression information. In this example, the client applications may therefore have no access to the highly-sensitive raw microphone audio reflecting the user's speech.

Furthermore, the client applications may use the expression information to update respective avatars without being required to each process sensor information into useful avatar information. For example, the expression information may include information derived from sensors of the wearable system (e.g., a head-mounted display or HMD that displays AR, MR, and/or VR content to the use) which is stored in a standardized (e.g., known) format. Thus, the client applications may use the expression information to update rig controls of their respective avatars with limited additional processing. In implementations in which the wearable system consumes battery power, such as a mobile display device, this reduction in additional processing may preserve battery life. Additionally, this reduction in processing may ensure that processing resources may be used for other purposes to enhance use of the wearable system.

Example Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Smooth animation—Animation may be considered perceptually smooth if the user cannot observe, or cannot easily observe, physically implausible discontinuities in the object's movement. In mixed reality, animation may be updated in sync with the display refresh rate to appear smooth (e.g., substantially in sync). An example update rate may be 60 Hz. In some embodiments, the update rate may be 120 Hz, 240 Hz, and so on. As may be appreciated by those skilled in the art, if the update rate is lower, then animation may appear jittery to the user.

Sensory data—Data obtained from the sensors built into the mixed reality device. Examples of sensory data may include head pose (e.g., obtained using camera SLAM and inertial tracking), eye gaze direction and distance (e.g., obtained using eye cameras), hand-held controller position and orientation, and microphone audio.

Expression data—Data describing user movements suitable for avatar animation. Expression data may be smooth and in a format that can be easily mapped to avatar rig controls. For example, a standardized format may be used.

Avatar rig—Mathematical model used to control the avatar's movements. Parameters of this model are called rig controls. For example, an avatar may have rig controls for opening and closing the eyes, for moving the hands through space, for putting fingers into poses (e.g., open hand, thumbs up). In some embodiments, an avatar rig may include one or more bones, end-effectors, joints, and so on.

Expression inference—Inference of expression data from sensory data. This inference can entail conversion of data types, range remapping, or coordinate system conversion (e.g., with respect to spatial data). It can also entail heuristic inference (e.g., inferring the pelvis location as a moving average of the head location) or data-driven inference (e.g., using deep neural networks).

High-sensitivity data—Highly confidential or identifiable data, which, if disclosed to a malicious party, could cause harm to the user. In mixed reality context, audio data from the microphone or video data from built-in cameras may, as an example, be considered high-sensitivity. Untrusted applications typically cannot access this data or can only do so with explicit consent of the user. In some embodiments, this consent may need to be granted every time, or a subset of times, the application wants to access the data.

Low-sensitivity data—Data which, if disclosed to a malicious party, has a low likelihood of identifying the user or otherwise causing them serious harm. In mixed reality context, head pose and hand-held controller location may, as an example, be considered low-sensitivity. Untrusted applications may have implicit access to low-sensitivity data, or the user may need to grant one-time consent for the app to access it.

Client application—An application running on the mixed reality device, such as an application that wants to animate the user's avatar.

Untrusted application—An application that comes from an untrusted source, such as a third party. Such apps do not have unfettered access to sensitive data on the mixed reality device—instead, the user may, as an example, be required to give their explicit consent to let the untrusted application access such data.

Privilege manager—A software component of a mixed reality platform, which controls application access to program interfaces of platform services.

App focus—In a multitasking environment, where multiple applications can run at the same time, an application has focus if the user can interact with it (e.g., interact with virtual content). In some embodiments, only one application can have focus at a time. Focus is needed to ensure that, when the user tries to interact with the app via input (e.g., gestures or a hand-held controller), they do not inadvertently interact with other, currently running apps. In some embodiments, more than one application can have focus. In these embodiments, as an example, the applications may present virtual content at different locations or with different visual indications to inform the user with which application the content is associated.

Example Avatar Rendering

As described above, a client application may generate an avatar which is updated (e.g., in substantially real-time) to track movements of a user. The client application may be executed by a display system worn by the user (e.g., a mixed or augmented reality display system). In this way, the client application may output virtual content which places the user's avatar in the real-world environment being viewed by the user. The avatar may thus represent a virtual persona of the user. As may be appreciated, the client application may render an avatar whose appearance ranges from a realistic representation of the user to a more abstract character. For example, an avatar may include an animal or fantasy creature which is updated based on movements of the user. In this example, an animal's face, such as the face of a panda, may therefore be updated based on the user's facial expressions.

The avatar may allow the user to extend himself/herself into an augmented or virtual reality scene. An example client application may include a social application in which the user can chat with a different user. Advantageously, the user may view the user's avatar communicating with the avatar of a different user. Another example client application may include a game in which the user's avatar navigates a game world formed from augmented or virtual reality content. Thus, the user may control his/her avatar by movement of the user's body. In this way, the user may adjust an arm or leg and view the corresponding updates to the avatar via the wearable system.

An example avatar may be rendered by a client application based on updating of rig controls of the avatar. An example rig control may include positions of joints of a skeleton underlying the avatar. Another example rig control may include the mouth movements, or facial shapes, which are to be reflected in the avatar. These mouth movements or facial shapes may be based on information derived from the user's actions (e.g., speech and/or facial movements of the user). Additionally, certain blend shapes may be used to animate the avatar. As an example, a blend shape may represent a deformed version of a mesh which may be stored as a series of vertex positions. To animate the avatar, such as animating the face, the vertices may be interpolated between the stored positions to produce animation.

In this way, to render a realistic avatar, a client application may require continuing updates regarding movement of the user. For example, the client application may require images of the user's eyes to determine locations at which the user is fixating. As another example, the client application may require microphone audio to infer mouth movements of the user. In this example, the mouth movements may reflect phoneme mouth shapes.

To render an avatar, a client application may therefore require sensor information reflective of, or otherwise associated with, the user (e.g., images of the user, audio, movement information, and so on). However, access to this sensor information may introduce privacy concerns. For example, eye-tracking information, inertial measurement unit information (e.g., accelerometer, gyroscope, information), images from a camera of the wearable system (e.g., camera assembly 630 described below), microphone audio, and so on, may include highly-sensitive information. Since client applications may be created by third-parties, users may prefer to not provide such sensitive information to these third-party created applications.

Furthermore, the raw sensor information generated by the wearable system may have no intuitive mapping to the rig controls described above. Thus, client applications may have to generate their own unique implementations of techniques for rendering avatars based on the sensor information. As may be appreciated, these techniques may vary in quality such that a first client application may realistically render mouth movements while a second application may present jerky, unnatural, mouth movements. Additionally, each client application may consume substantial computational resources when rendering avatars based on sensor information.

Thus, at present there is no technique to allow for client applications (e.g., mixed reality or augmented reality applications), including trusted and untrusted client applications, to access expression data of the user such that privacy of sensitive senor information is maintained even while rendering expression-accurate avatars. Additionally, at present there is no technique to allow for multitudes of applications to render avatars without unduly burdening computation resources, or battery life, of the display system.

As will be described below, with respect to FIGS. 10A-13, expression information may be generated by a platform level expression service that may be used by any client application that is authorized to access the expression information. For example, a wearable system (e.g., system 60) may provide the platform level expression service (e.g., which may be accessible using one or more APIs). Expression information may reflect information derived from sensors of the wearable system which is usable to update avatars being rendered by the client applications. The expression information may include inferred information associated with a body of the user, eyes of the user, mouth movements of the user, hand positioning and orientation of the user, and so on.

Client applications may subscribe to the expression information, such as via an expression service, and use the information for rendering avatars. Advantageously, the expression information may be generated by a system or platform level expression service (or expression process) of the wearable system. Thus, direct access to underlying sensor information may only be authorized by this system or platform level process. The client applications may be authorized to merely access the derived expression information, and without direct access to the more sensitive sensor information. Additionally, the expression information may be generated by the system or platform level process while being accessed by many client applications. Thus, each client application may leverage the same expression information, or portions of the expression information that the particular client application is authorized to access, to reduce a processing burden on the wearable system and/or other devices associated with the wearable system.

As will be described below, for example in FIG. 10B, the user may be authorize use of expression information by particular client applications. For example, the user may execute a client application which is configured to render an avatar. The client application may use an API to call an expression service (e.g., a system or platform level function) to subscribe to expression information. Advantageously, the wearable system may provide a prompt to the user (e.g., a single prompt, which may be virtual content) to authorize the client application's use of expression information. In contrast, techniques which do not leverage expression information from an expression service may require the user to authorize the use of information from each type of sensor. As an example, the user may have to go through separate prompts to authorize a client application's use of imaging data, microphone data, inertial measure unit data, and so on.

Once one or more client applications are authorized, they may obtain expression information which is being continuously updated by the expression service. Since the expression information may be in a standardized format known to creators of the client applications, respective avatars may be rapidly rendered by the applications. For example, the client applications may map certain expression information to certain rig controls of the avatar. Thus, as the user speaks certain words the expression information may reflect phoneme weights of the words. These phoneme weights may be obtained by the client applications and mapped to the updating of mouths of the respective avatars.

Since each client application is obtaining already generated expression information, the computational requirements of each client application to render avatars is substantially reduced. As described above, typically client applications would need to implement complex mathematical inference models to convert sensor information into information usable to update avatars. In contrast, the techniques described herein allow client applications to access already generated information.

In addition to the above-described reduction in computational resources, the expression information may be updated at a lower frequency than a frequency with which the client applications update their avatars. For example, the wearable system may use substantial processing to generate expression information from hardware sensors. Indeed, and as an example, the above-described inference models may implement machine learning models (e.g., deep-learning models) or other computationally costly techniques. To reduce a burden on the wearable system, the expression information may therefore be updated at a particular frequency (e.g., 10 Hz, 20 Hz, 40 Hz).

However, each client application may render an avatar at a different frequency (e.g., 60 Hz, 75 Hz, 120 Hz). This different frequency may allow for smooth animation of the avatar. Therefore, there may be a difference between the update rate of the expression information and the update rate of the avatars. As will be described below, with respect to at least FIG. 12, an expression buffer may be used to address this difference. The expression buffer may implement delay buffering, ensuring that the client applications do not sample expression information beyond the most-recently information. Furthermore, interpolation may be used to allow for the client applications to sample at the different frequency.

In this way, animation may be enhanced while other compute and power budget may be left to higher priority, or critical, system or platform level services. As an example, perception services may require substantial compute budget to allow tracking of the user's gaze for realistic placement of virtual content. Additionally, graphics and operating system processes may require compute budget for the wearable system to provide proper functionality. Since these services and processes may be required for operation of the wearable system, the wearable system may ensure that expression information uses a reduced compute budget.

Example Wearable System

Figure 2:
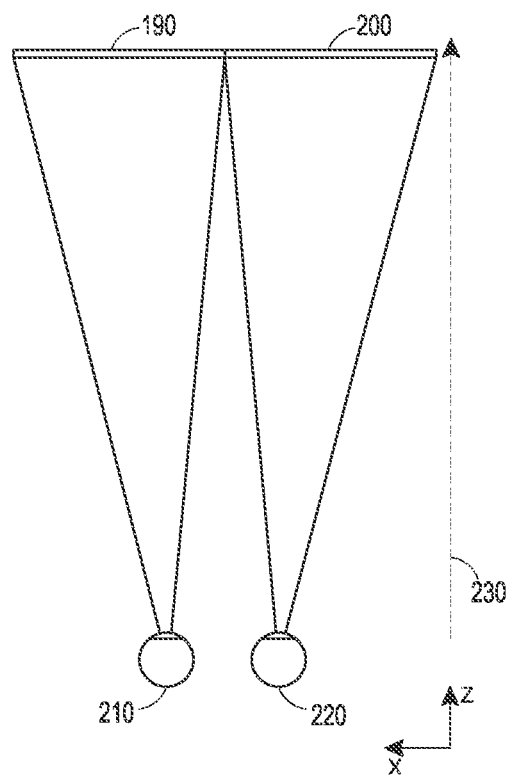
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
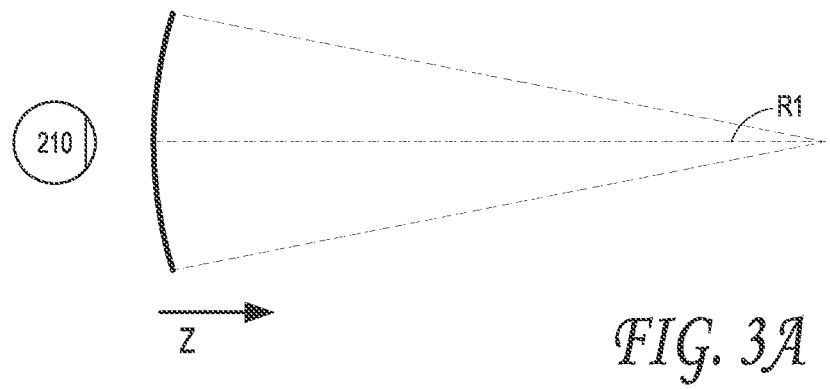
FIGS. 3A-3C illustrate relationships between radius of curvature and focal radius.
Figure 3B:
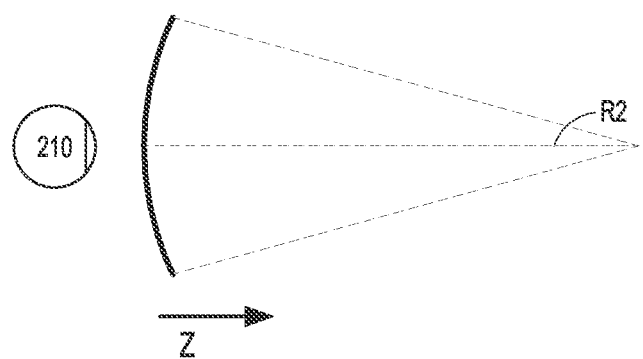
Figure 3C:
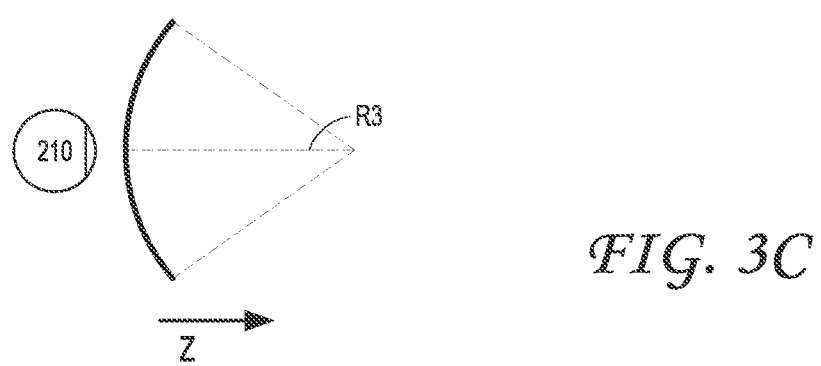

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
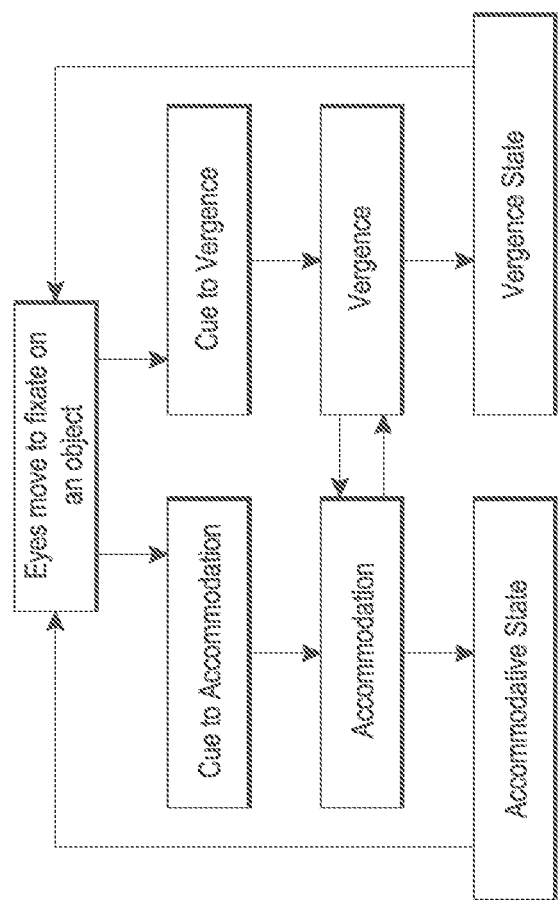
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
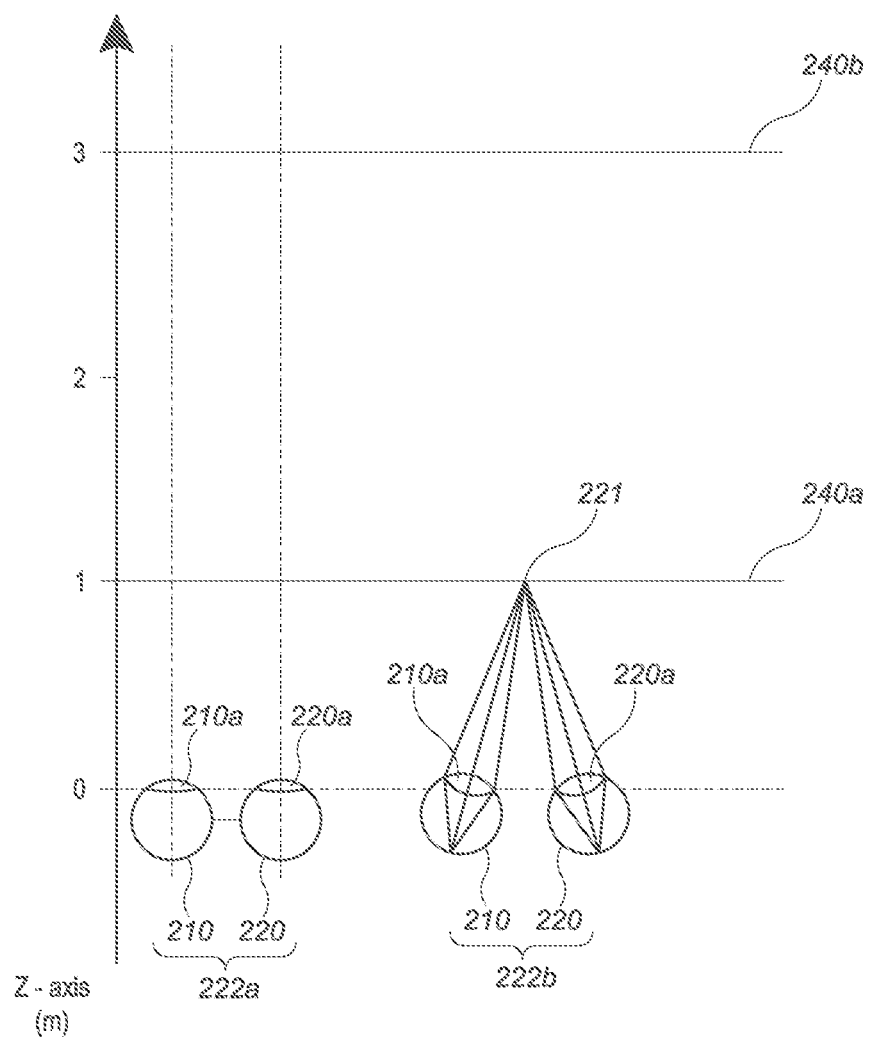
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
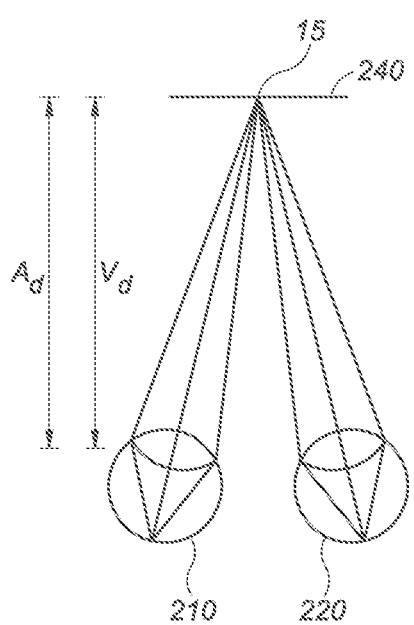
FIG. 4C illustrates an example of a representation of a top-down view of a user viewing content via a display system.
Figure 4D:
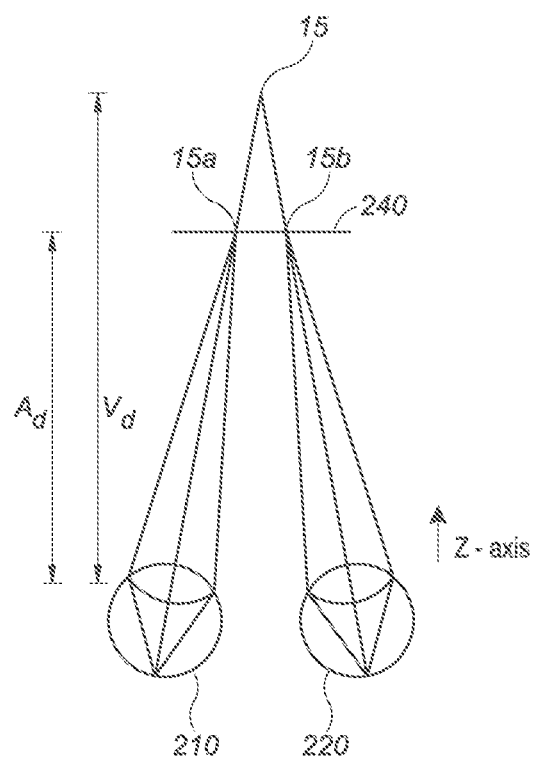
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d - A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the wearable system) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
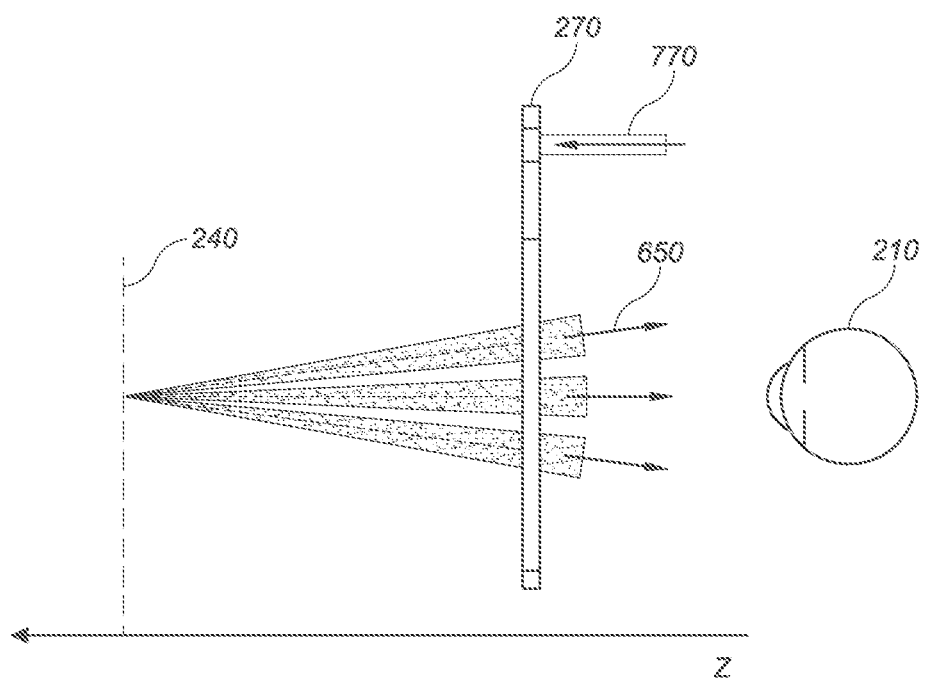
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
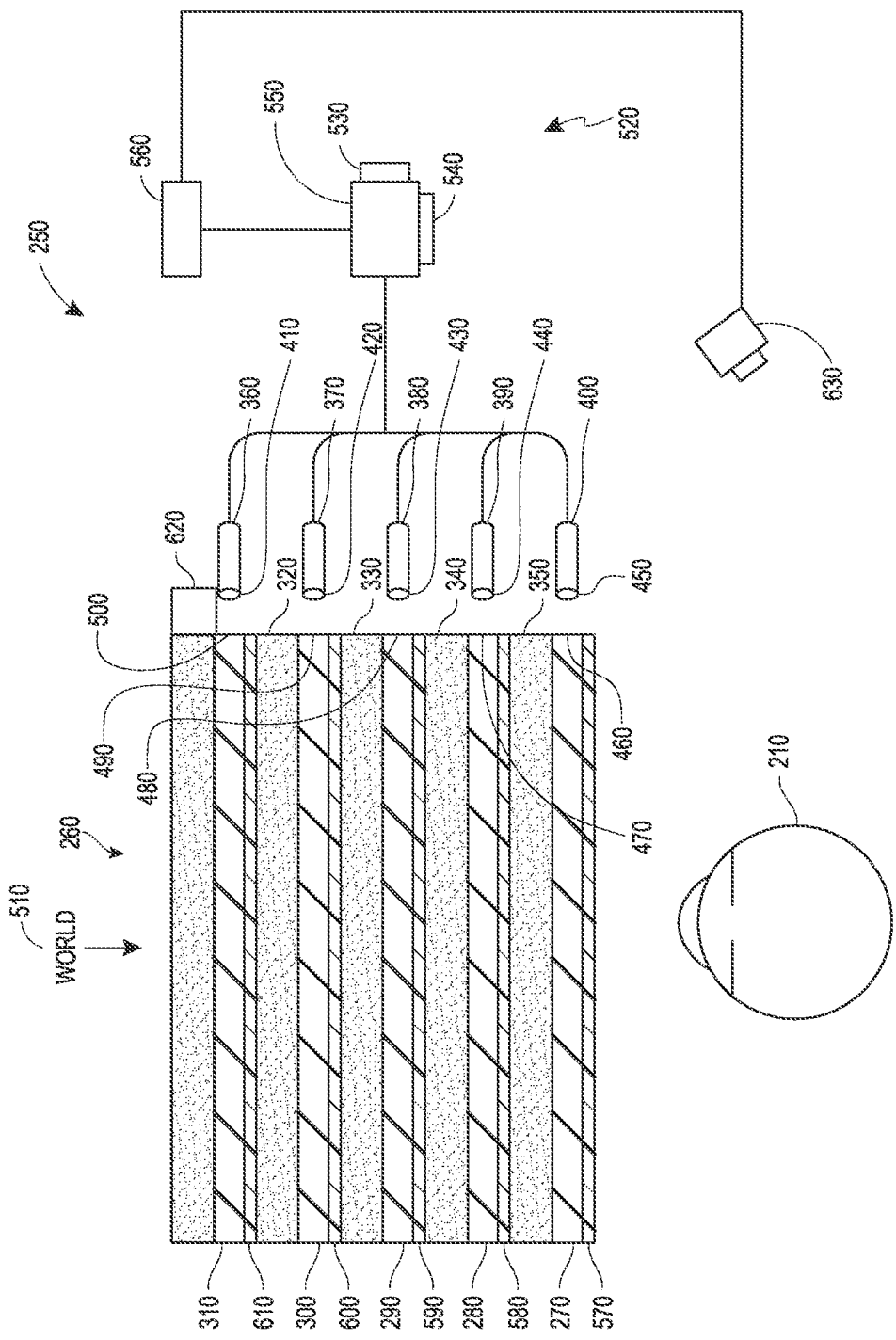
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projection system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. In some other embodiments, the spatial light modulator may be a MEMS device, such as a digital light processing (DLP) device. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9E) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame or support structure 80 (FIG. 9E) and may be in electrical communication with the processing modules 140 and/or 150, which may process image information from the camera assembly 630. In some embodiments, one camera assembly 630 may be utilized for each eye, to separately monitor each eye.

The camera assembly 630 may, in some embodiments, observe movements of the user, such as the user's eye movements. As an example, the camera assembly 630 may capture images of the eye 210 to determine the size, position, and/or orientation of the pupil of the eye 210 (or some other structure of the eye 210). The camera assembly 630 may, if desired, obtain images (processed by processing circuitry of the type described herein) used to determine the direction the user is looking (e.g., eye pose or gaze direction). In some embodiments, camera assembly 630 may include multiple cameras, at least one of which may be utilized for each eye, to separately determine the eye pose or gaze direction of each eye independently. The camera assembly 630 may, in some embodiments and in combination with processing circuitry such as the controller 560 or the local data processing module 140, determine eye pose or gaze direction based on glints (e.g., reflections) of reflected light (e.g., infrared light) from a light source included in camera assembly 630.

Figure 7:
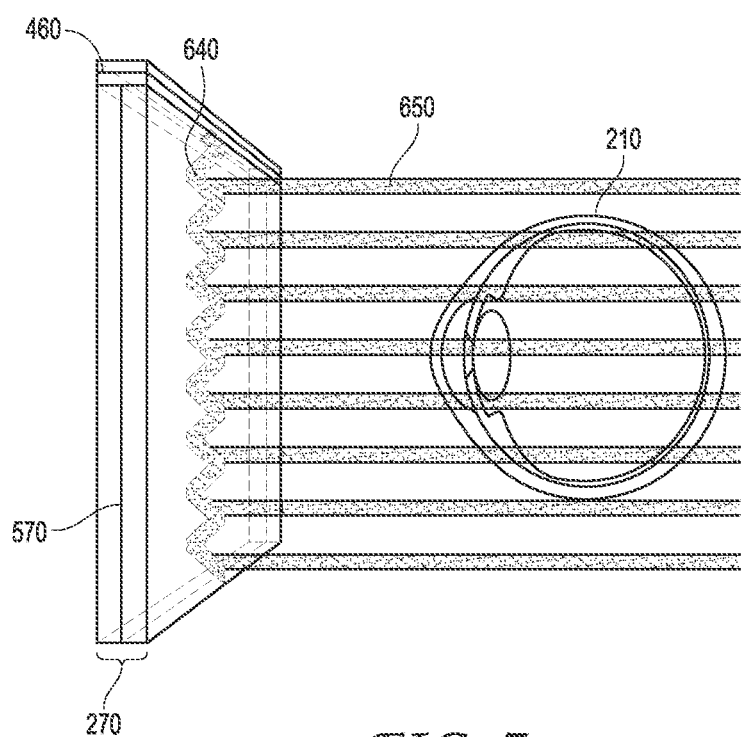
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
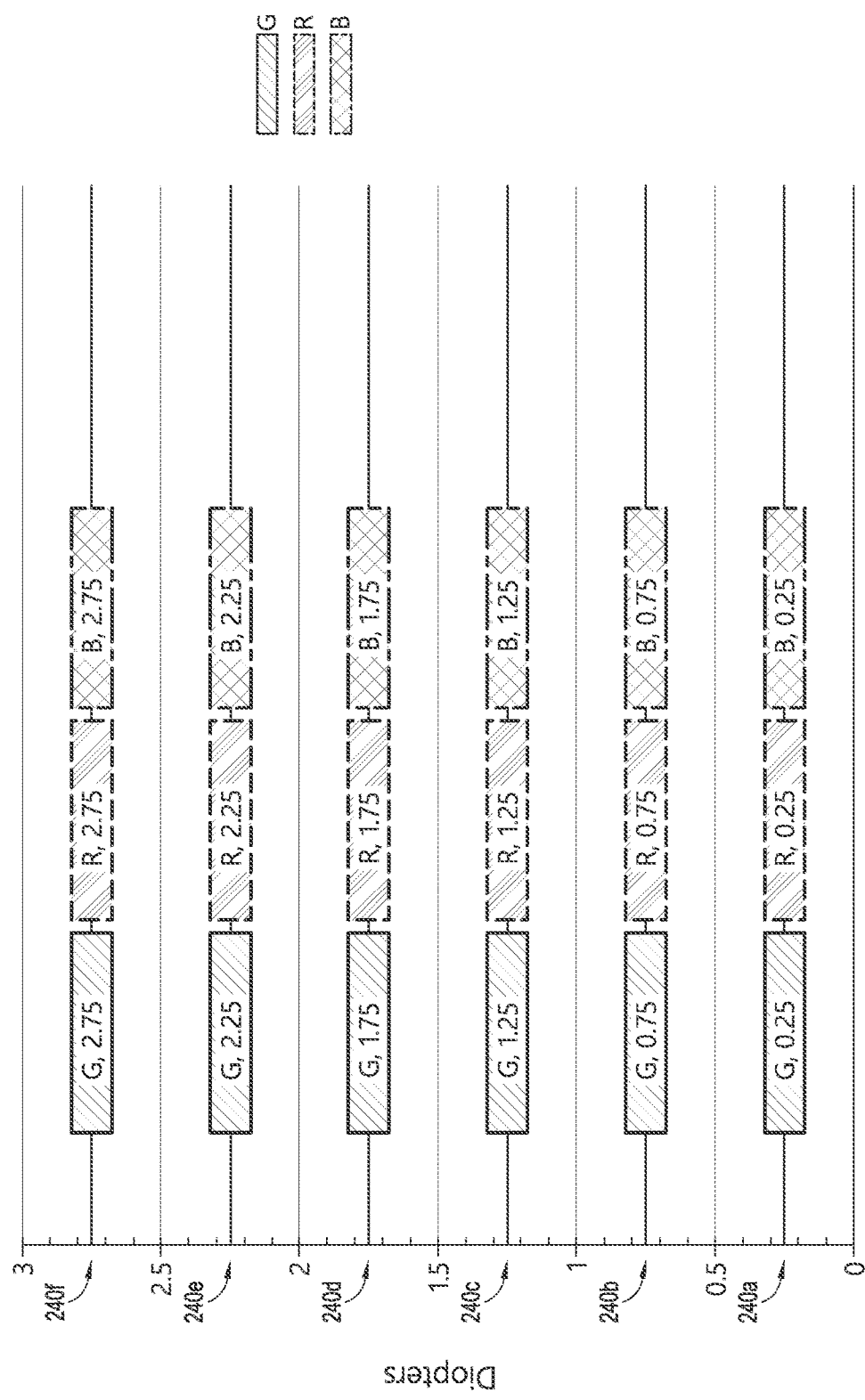
FIG. 8 illustrates an example of a stacked eyepiece in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
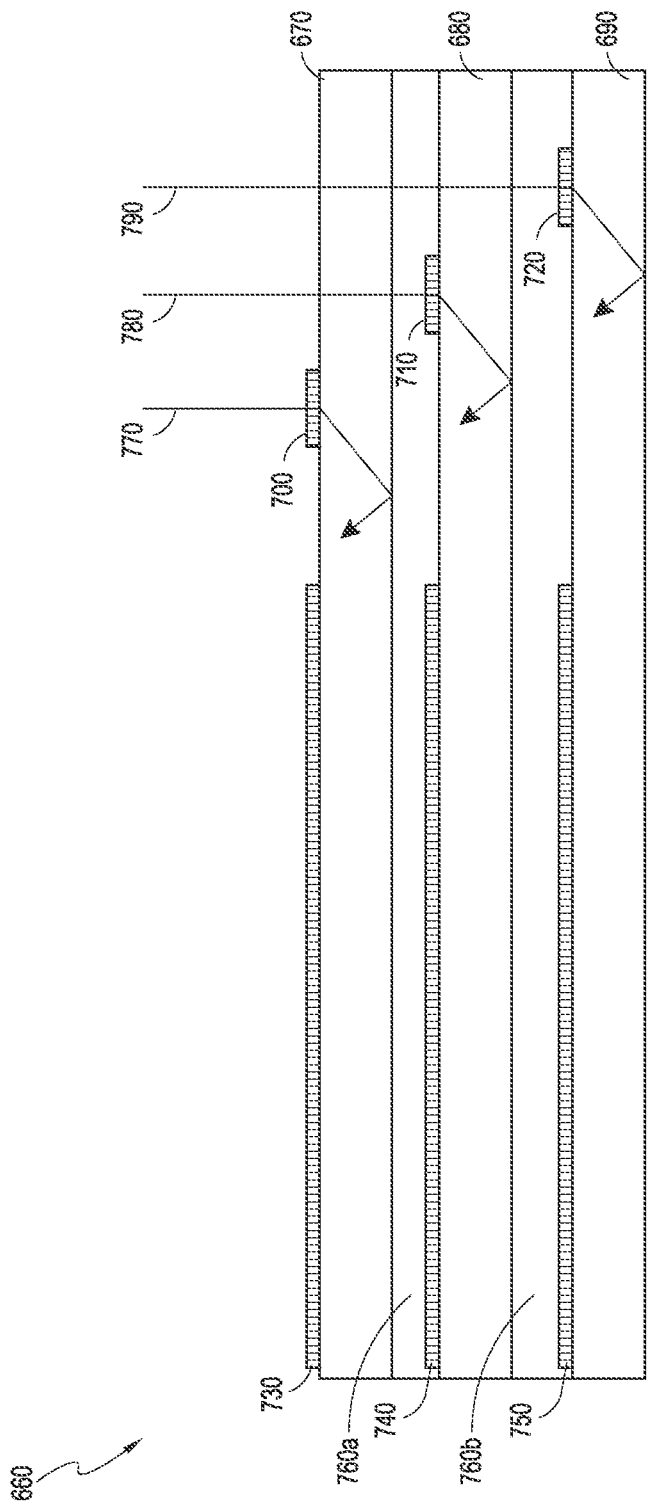
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another, as seen in the illustrated head-on view in a direction of light propagating to these in-coupling optical elements. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
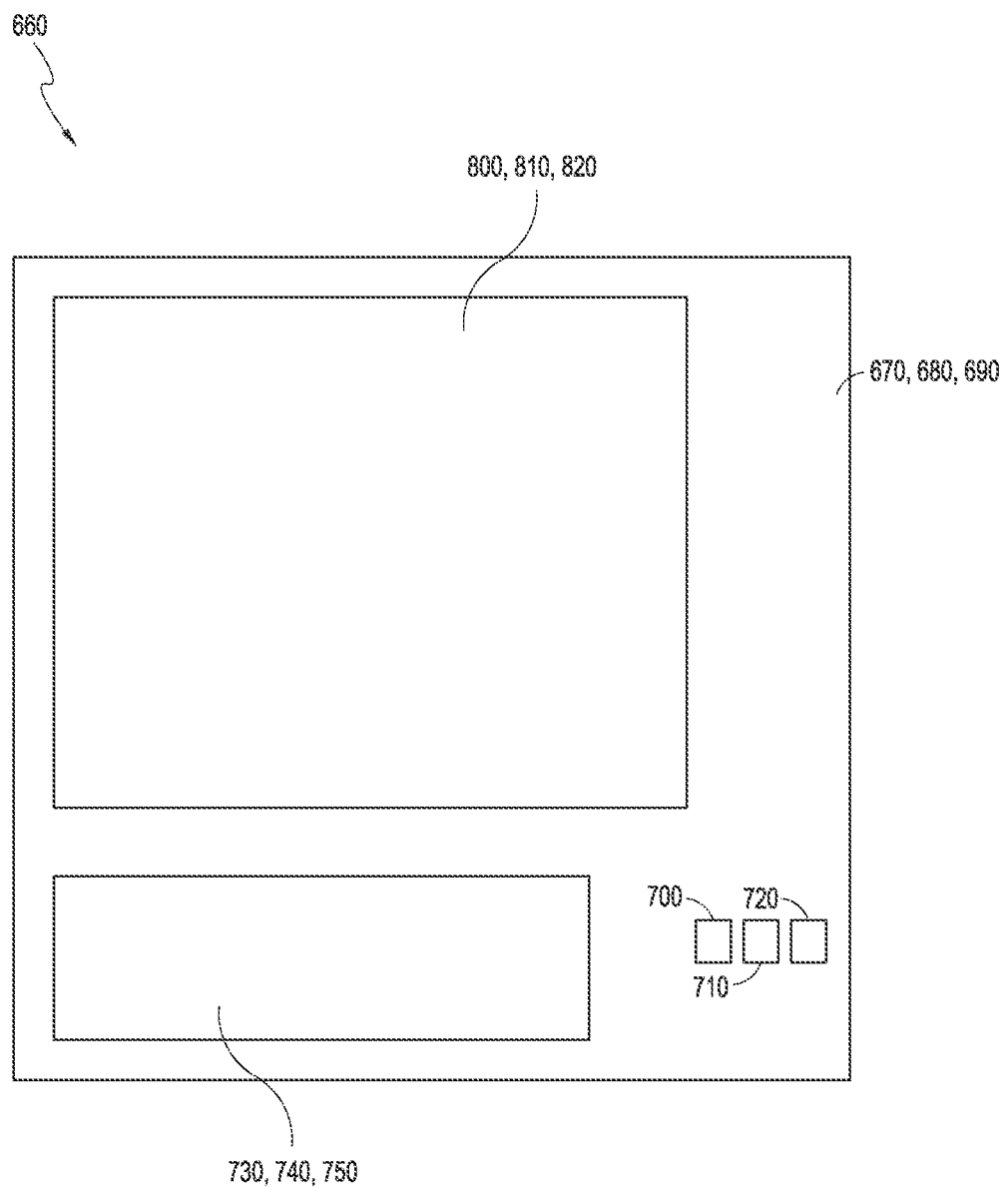
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. It will be appreciated that this top-down view may also be referred to as a head-on view, as seen in the direction of propagation of light towards the in-coupling optical elements 800, 810, 820; that is, the top-down view is a view of the waveguides with image light incident normal to the page. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub-pupils.

It will be appreciated that the spatially overlapping areas may have lateral overlap of 70% or more, 80% or more, or 90% or more of their areas, as seen in the top-down view. On the other hand, the laterally shifted areas of less than 30% overlap, less than 20% overlap, or less than 10% overlap of their areas, as seen in top-down view. In some embodiments, laterally shifted areas have no overlap.

Figure 9D:
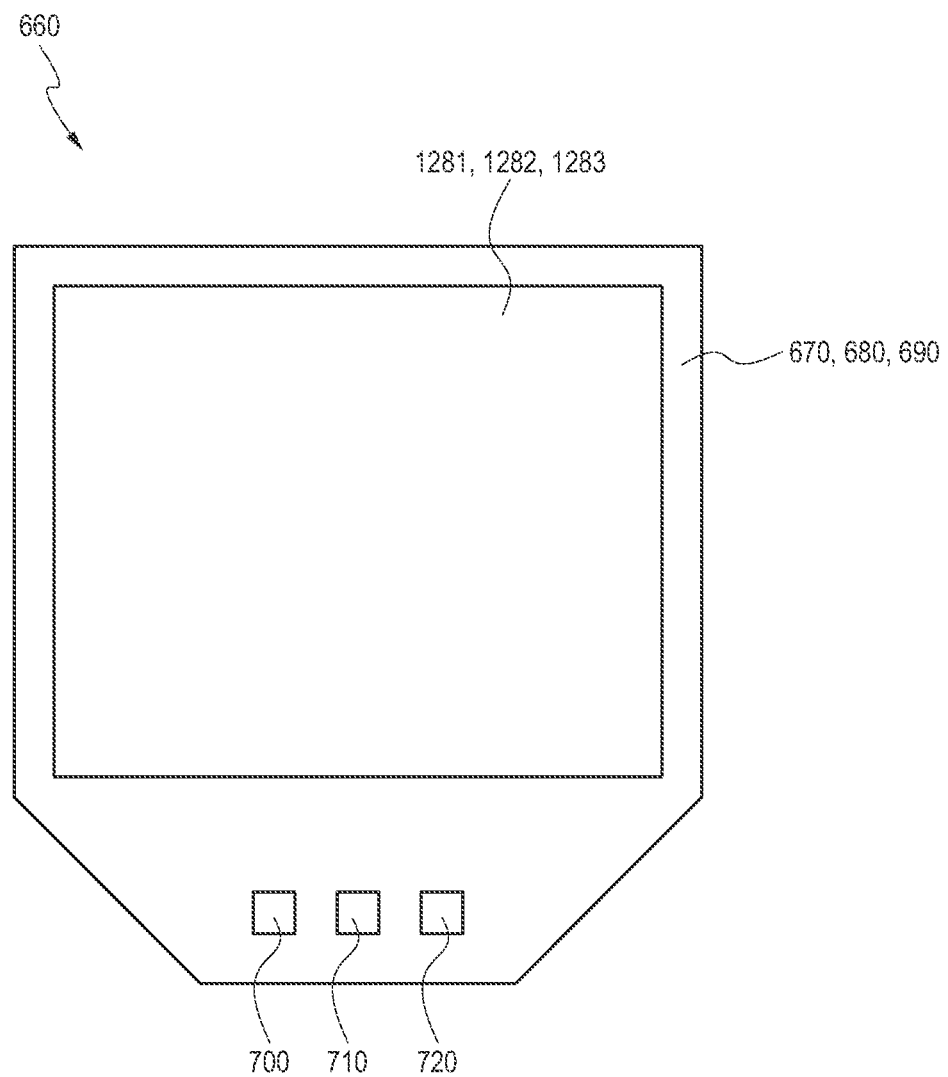
FIG. 9D illustrates a top-down plan view of another example of a plurality of stacked waveguides.

FIG. 9D illustrates a top-down plan view of another example of a plurality of stacked waveguides. As illustrated, the waveguides 670, 680, 690 may be vertically aligned. However, in comparison to the configuration of FIG. 9C, separate light distributing elements 730, 740, 750 and associated out-coupling optical elements 800, 810, 820 are omitted. Instead, light distributing elements and out-coupling optical elements are effectively superimposed and occupy the same area as seen in the top-down view. In some embodiments, light distributing elements (e.g., OPE's) may be disposed on one major surface of the waveguides 670, 680, 690 and out-coupling optical elements (e.g., EPE's) may be disposed on the other major surface of those waveguides. Thus, each waveguide 670, 680, 690 may have superimposed light distributing and out coupling optical elements, collectively referred to as combined OPE/EPE's 1281, 1282, 1283, respectively. Further details regarding such combined OPE/EPE's may be found in U.S. application Ser. No. 16/221,359, filed on Dec. 14, 2018, the entire disclosure of which is incorporated by reference herein. The in-coupling optical elements 700, 710, 720 in-couple and direct light to the combined OPE/EPE's 1281, 1282, 1283, respectively. In some embodiments, as illustrated, the in-coupling optical elements 700, 710, 720 may be laterally shifted (e.g., they are laterally spaced apart as seen in the illustrated top-down view) in have a shifted pupil spatial arrangement. As with the configuration of FIG. 9C, this laterally-shifted spatial arrangement facilitates the injection of light of different wavelengths (e.g., from different light sources) into different waveguides on a one-to-one basis.

Figure 9E:
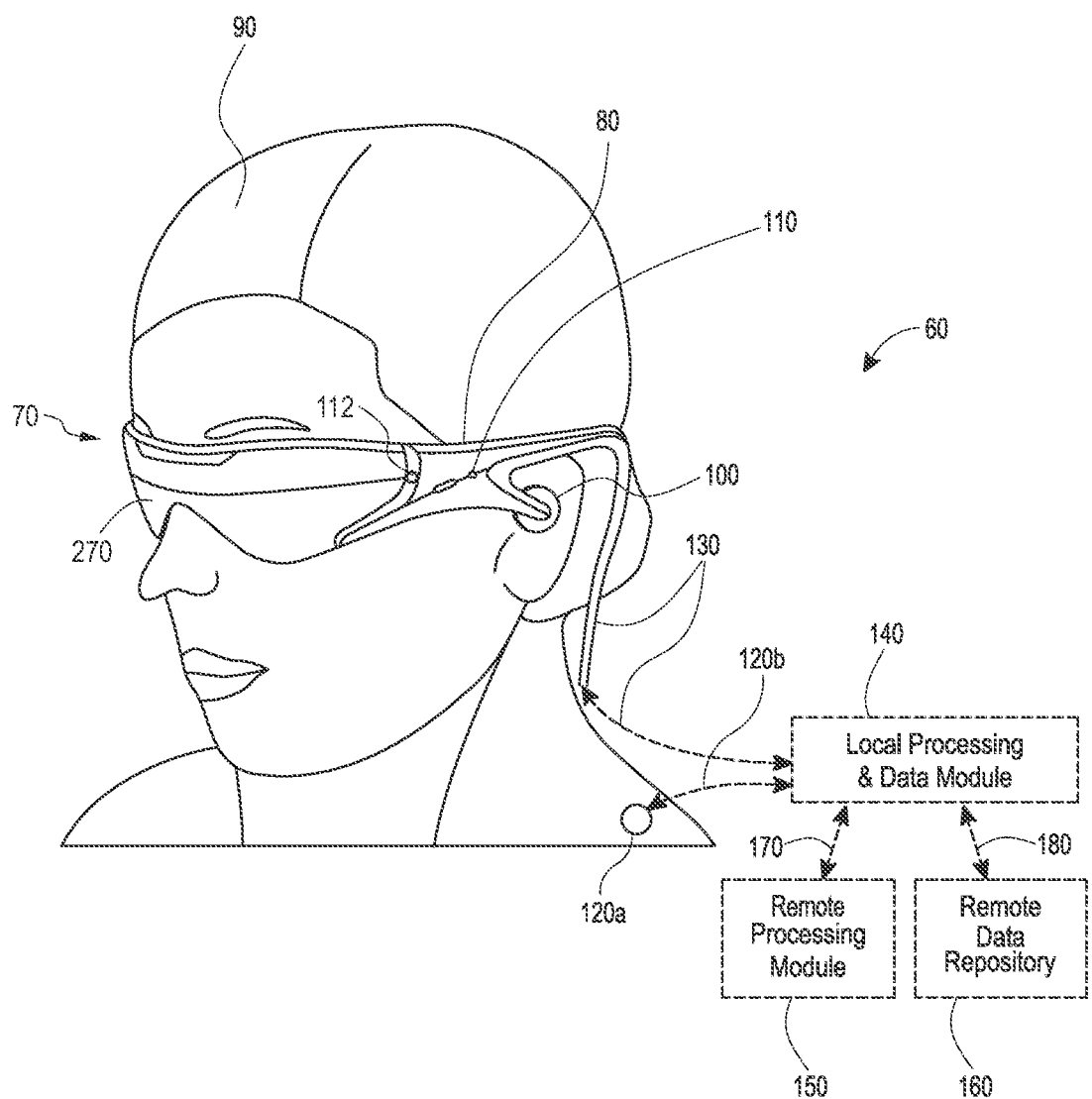
FIG. 9E illustrates an example of wearable display system.

FIG. 9E illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9E, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. The display 70 may include one or more waveguides, such as the waveguide 270, configured to relay in-coupled image light and to output that image light to an eye of the user 90. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9E, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9E, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating virtual content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Expression Information

As described above, a client application (e.g., an application obtained from an online application store) may be configured to render a representation of a user of a display device (e.g., wearable display system 60). As described herein, this representation may be an avatar rendered based on movement information of the user. Since the client application may be created by a third-party, it may be disadvantageous to allow for the client application to directly access sensor information of the wearable system. As an example, the sensor information may be sensitive information of the user. Additionally, it may be disadvantageous to require or allow the client application to use compute resources of the wearable system to implement sophisticated inference models to enable updating of the avatar based on the sensor information. For example, these inference models may require substantial expertise to implement in a realistic fashion. In this example, the sensor information may include gaps and require substantial filtering. Furthermore, a poor or inefficient inference model implementation may reduce a user experience of the user.

Therefore, an expression service of the wearable system may generate expression information as a platform or system level process. For example, this expression information may include information derived from sensors of the wearable system using various models, such as disparate inference models. Advantageously, the expression information may therefore be determined once and made accessible by one or more authorized client applications. Since the expression information may be automatically generated, multiple client applications may leverage the same information. In this way, respective avatars may be generated by the client applications without requiring separate analysis of the sensor data. Additionally, the client applications may have access merely to the expression information rather than the sensitive sensor information itself.

Described below are techniques for generating, and enabling access to, the above-described expression information. Examples below reference certain inference models which leverage sensors of the wearable system. Different inference models may be employed and fall within the scope of the disclosure herein. Example inference models may be based on machine learning techniques, probabilistic techniques, clustering techniques, and so on. Example sensors may include imaging sensors, accelerometers, gyroscopes, inertial measurement units, microphones, location sensors (e.g., global navigation satellite system sensors), and so on.

In some embodiments, a user of the wearable system may operate input devices (e.g., hand-held controllers). These input devices may communicate with the wearable system, such as via a wired or wireless connection, and may provide sensor information to the wearable system. For example, the provided sensor information may reflect orientation and/or position information of the input devices.

Example description of an inference model for determining position information of a user's hands and/or input devices is described in U.S. patent application Ser. No. 16/692,751 which is incorporated herein by reference in its entirety.

Example Block Diagram—Expression Information

Figure 10A:
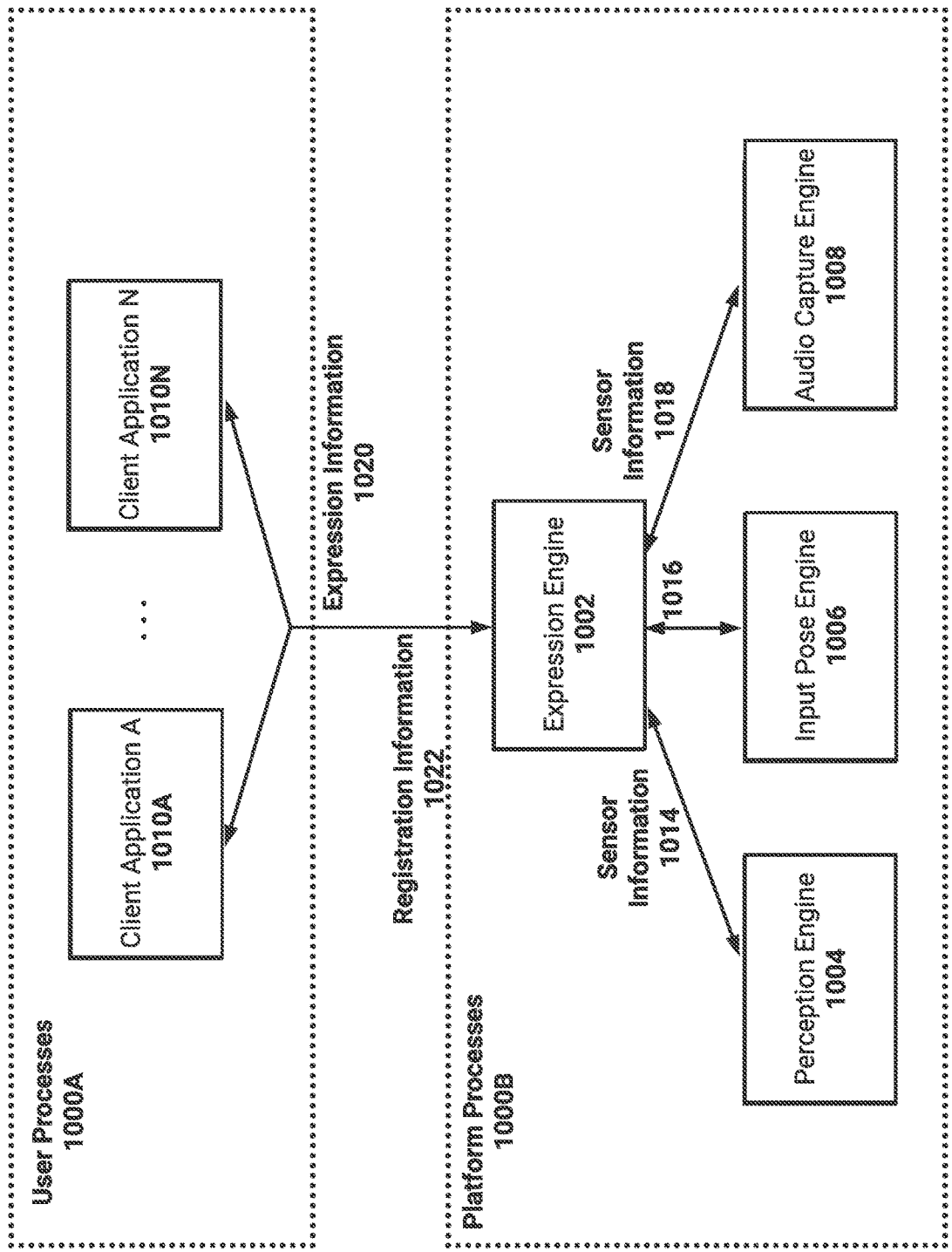
FIG. 10A illustrates a block diagram of an example expression engine in communication with client applications.

FIG. 10A illustrates a block diagram of an example expression engine (or "expression service") 1002 in communication with client applications 1010A-1010N. As illustrated in FIG. 10A, a wearable system may separate processes into, at least, user processes 1000A and platform processes 1000B. This separation may ensure that client applications 1010A-1010N have limited access to more secure, underlying, processes of the wearable system. For example, the client applications 1010A-1010N may be constrained in their ability to access, or otherwise reach, platform or system level processes 1000B. Since the client applications 1010A-1010N may be created by third-parties, their access to sensitive information may be tightly controlled. In contrast, platform or system level processes 1000B may have access to sensitive information of a user.

A client application 1010A may require certain platform or system level information to execute properly. The example client application 1010A, for example, may require location information of the wearable system. The location information may be used by the client application 1010A to present certain virtual content to the user. As an example, the client application 1010A may represent a map application which provides directions to the user. The client application 1010A may therefore request this location information from the wearable system. For example, the client application 1010A may register with certain platform processes 1000B to receive the location information. In this example, a user of the wearable system may authorize use of the location information.

In FIG. 10A, the client applications 1010A-1010N may require expression information 1020 to properly render avatars as virtual content to the user. This expression information 1020 may be generated, and otherwise controlled by, the expression engine 1002. With respect to the example of the map application, a client application may render an avatar as being perceived within a real-world environment of the user. For example, the map application may render the avatar as being at a certain depth from the user and indicating turns the user is to make when positioned at the depth. In this example, the avatar may be shown turning corners, crossing the street, and so on. Advantageously, the avatar's movements may be informed, at least in part, based on movement information of the user. For example, the user's gait (e.g., movement speed, leg movements), may be reflected in the avatar. As another example, hand motions of the user may be reflected in the avatar.

A different client application may optionally render an avatar for use in a game. For example, the avatar may be rendered as a certain fantasy creature. In this example, the avatar's mouth movements may correspond with the mouth movements of the user. As will be described, these mouth movements may be generated from phoneme information (e.g., phoneme weights) included in the expression information 1020.

Thus, for the client applications 1010A-1010N to provide accurate expression characteristics of avatars, they may register with the wearable system to receive expression information 1020. As described above, the expression information 1020 may include information usable to update an avatar. For example, and as will be described in more detail below, the expression information 1020 may map to rig controls of an avatar.

In the illustrated embodiment, the client applications 1010A-1010N may provide registration information 1022 to the expression engine 1002. The registration information 1022 may reflect information identifying each client application. As an example, the client applications 1010A-1010N may register as clients of the expression engine. In this way, the client applications 1010A-1010N may subscribe to updates of the expression information implemented by the expression engine 1002.

The expression engine 1002 may generate expression information 1020 from sensors of the wearable system. As will be described, the expression engine 1002 may implement different inference models to generate the expression information 1020. Each inference model may use information from certain sensors (e.g., a subset of the sensors or all of the sensors). In some embodiments, different engines 1004-1008 may be used to obtain information from respective sensors.

For example, the perception engine 1004 may obtain information originating from wearable cameras or other imaging sensors, inertial measurement units, and so on. In this example, a body inference model may use the obtained information to determine head pose. As another example, the input pose engine 1006 may obtain information originating from imaging sensors, input devices (e.g., hand-held controllers), and so on. In this example, a hand inference model may use the obtained information to determine position and/or orientation information of the user's hands. As another example, the audio capture engine 1008 may obtain speech being output by the user into one or more microphones of the wearable system. In this example, a phoneme inference model may use the obtained information to determine phoneme information corresponding to the user's speech (e.g., phoneme weights).

In this way, the expression engine 1002 may obtain sensor information 1014-1018 from the engines 1004-1008. In some embodiments, each of the engines 1004-1008 may process raw sensor information into a format suitable for the expression engine 1002. As an example, the perception engine 1004 may obtain sensor information from imaging sensors, inertial measurement units, and so on. In some embodiments, the perception engine 1004 may perform data type conversions, discard unnecessary data or data streams, and so on. With respect to information from the inertial measurement units, the perception engine 1004 may perform certain filtering operations to prepare the information for efficient use by the expression engine 1002. Example filtering operations may include discarding outlier values, determining measures of central tendency, clustering values, implementing Kalman filters and so on.

Sensors of the wearable system may output information at varying update rates. For example, inertial measurement units may be sampled at a high frequency (e.g., 100 Hz or more). This sampled information may be used by different platform processes 1000B during typical operation of the wearable system. For example, the information may be used to inform locations at which virtual content is to be presented. In this example, the wearable system may need to have access to this high frequency data to account for rapid head movements of the user. However, for rendering of avatars, this high frequency information may not be needed and may introduce a computational burden.

Thus, in some embodiments, the engines 1004-1008 may filter the sensor information being sampled at the high frequency. In this way, the engines 1004-1008 may provide inertial measurement unit information at a reduced frequency to the expression engine 1002. As will be described below, with respect to FIG. 12, in some embodiments the reduced frequency may be 10 Hz, 20 Hz, 40 Hz, and so on.

The generated expression information 1020 may be of a format known to the client applications 1010A-1010N, such that they can rapidly map the information 1020 to respective avatars. In some embodiments, the expression information 1020 may include head position and/or orientation of the user's head. The expression information 1020 may also include position and/or orientation of a root of the user. For example, the root may be the user's center of mass, such as the pelvis. As another example, the root may be determined to be on the ground. The expression information 1020 may also include eye lid openness, eye-gaze point, whether the user is blinking or performing a saccade, and so on. In some embodiments, eye lid openness may reflect a value in a range, with the value indicating an extent to which an eye lid is open. The expression information 1020 may also include phoneme information, such as phoneme weights. The expression information 1020 may also include blend shapes associated with facial movements. The expression information 1020 may also include audio information, such as audio amplitudes.

The expression information 1020 may include hand information. Example hand information may include a position of each hand, whether a certain hand is being tracked (e.g., whether it is visible in images taken by the wearable system or whether it is holding an input device), position and/or orientation of an input device, and so on. The expression information 1020 may also include hand pose information, such as a pose of the user's fingers, whether the user is giving a thumbs up, and so on. Determining hand information is described in more detail in U.S. patent application Ser. No. 16/692,751, which is hereby incorporated herein by reference in its entirety.

In some embodiments, the expression information 1020 may reflect information from external cameras or sensors. As an example, a smart phone may be pointed at the user by another person. Images of the user may be analyzed (e.g., via the smart phone or the wearable system) to determine expression information. For example, positions of portions of the user's body may be determined (e.g., positions of legs, leg stance, torso stance, and so on).

The client applications 1010A-1010N may therefore access this expression information 1020 and use it to update respective avatars. Since the expression information 1020 is generated in a known format, the client applications 1010A-1010N can avoid additional processing to make sense of the information 1020. For example, phoneme weights may be provided in a format to effectuate easy updating of mouth positions of an avatar. Additionally, hand position and orientation information may be provided in a format to effectuate easy updating of joints of a skeleton underlying an avatar. Additionally, blend shapes may be provided in the expression information 1020 to allow for updating of facial movements.

Figure 10B:
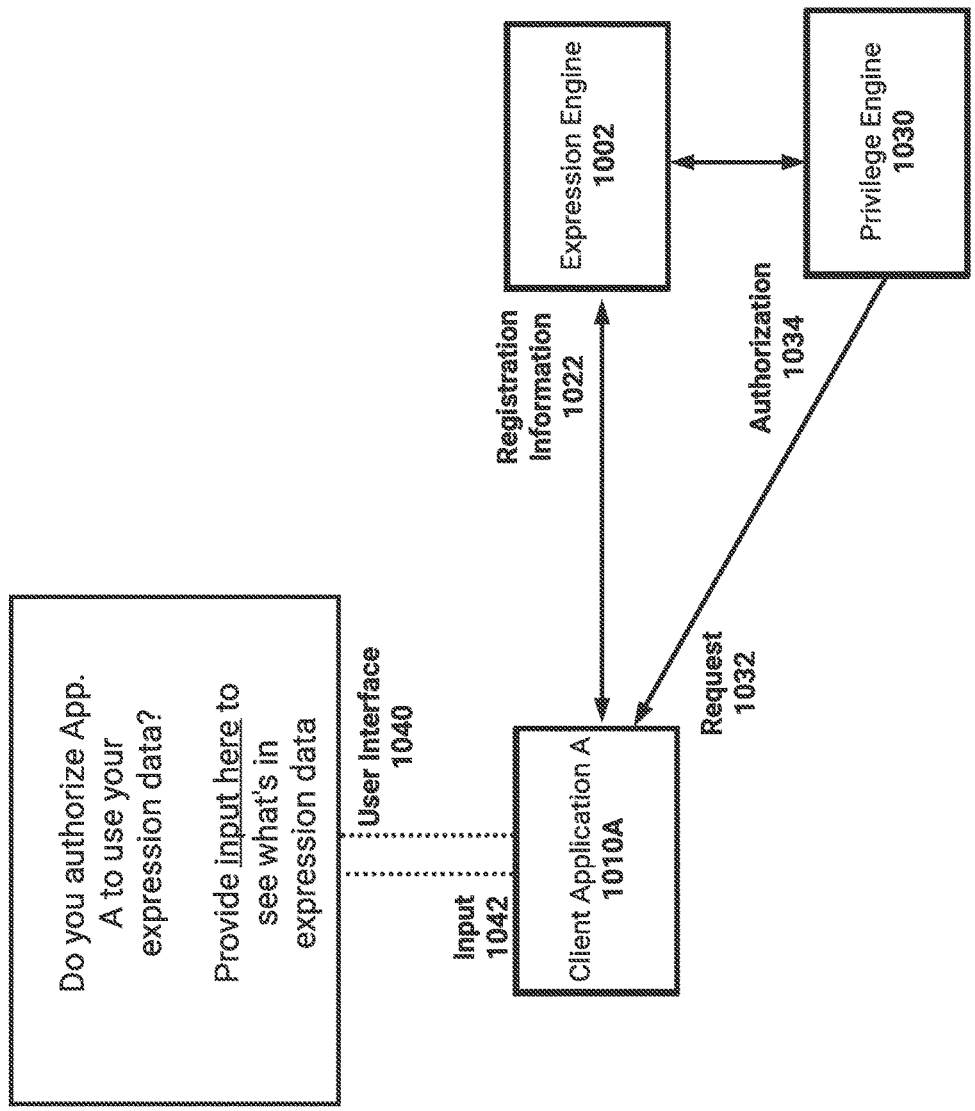
FIG. 10B illustrates an example of a client application registering with the example expression engine.

FIG. 10B illustrates an example of a client application 1010A registering with the example expression engine 1002. As described herein, expression information may provide added privacy protections to the user. For example, client applications may be unable to access underlying sensor information and instead merely access the derived expression information. While this added privacy protection may enhance a user experience, in some embodiments a user may be required to authorize all accesses to the expression information itself.

In the illustrated embodiment, client application A 1010A has been loaded onto the user's wearable system. Upon execution, the client application A 1010A may attempt to register with the expression engine 1002. For example, client application A 1010A may call an application programming interface (API) function to register itself. In some embodiments, this call may be protected by privilege engine 1030. For example, privilege engine 1030 may identify the call and request 1032 authorization from the user. In some embodiments, the expression engine 1002 may provide information to the privilege engine 1030 regarding the request for expression information. In some embodiments, the client application A 1010A may initially call an API function to request authorization from the privilege engine 1030.

The request 1032 may trigger a user interface 1040 for presentation to the user. For example, in some embodiments a system or platform dialog prompt may be presented to the user (rather than an application-level dialog). In this example, the dialog prompt may be presented as virtual content. As another example, in some embodiments a dialog prompt may be presented on a trusted device of the user (e.g., the user's smart phone, laptop, wearable device, and so on). An example of the user interface 1040 is illustrated in FIG. 10B. The user may provide input indicating whether he/she authorizes client application A 1010A to access the expression information. By way of example, the user may use an input device in the user's hand to indicate a response. The user may also verbally indicate an affirmative or negative response. The user may also use his/her hand to indicate a response. For example, the user can wave the user interface 1040 away to indicate a negative response. As another example, the user can point at the user interface 1040 to indicate an affirmative response.

In some embodiments, the user may view examples of expression information. For example, the user may provide input to user interface 1040 to view the examples. In this example, the wearable system may include textual descriptions of the expression information. Example textual descriptions may indicate which information is derived from which sensors (e.g., 'We provide phoneme weights to Application A based on your speech, but ensure privacy of the speech itself.').

In some embodiments, the user interface 1040 may present (e.g., in substantially real-time) examples of expression data being generated by the expression engine 1002. For example, the user interface 1040 may present an avatar generated by the wearable system which is updated based on expression information. As the user moves, speaks, and so on, the user interface 1040 may highlight portions of the avatar which are being updated. For example, the user interface 1040 may successively provide information for different types of expression information. In this example, the different types of expression information may correspond to information derived from the different engines 1004-1008 described above. As an example, mouth movements and facial movements may be highlighted. Subsequently, head pose and body movement information may be highlighted. Subsequently, hand movement information may be highlighted.

Optionally, short descriptions of the expression information being generated may be provided. For example, if the user moves his/her hand greater than a threshold measure (e.g., the user waves his/her hand around), the user interface 1040 may include a description of the corresponding expression information. In this example, the user interface 1040 may indicate that images of the user's hand, optionally along with information from an input device being held by the user's hand, are being used to generate this expression information.

In this way, the user of the wearable system may confirm consent and cause authorization 1034 to be provided to the privilege engine 1030. The privilege engine 1030 may then enable registration with the expression engine 1002. For example, the privilege engine 1030 may allow for the expression engine 1002 to provide (e.g., push) updates to client application A 1010A. As another example, the privilege engine 1030 may allow for the client application A 1010A to periodically read expression information from the expression engine 1002.

Advantageously, the user may be allowed to indicate consent one time that may then be stored by the privilege engine 1030 and used in later executions of client application 1010A. In contrast, other consent techniques may require the user to authorize use of each individual type of sensor, potentially each time a client application is executed. For example, the user may be required to indicate consent to use of imaging sensors, microphones, accelerometers, location sensors, and so on. Thus, the user experience of the user may be enhanced through the succinct request for authorization.

While the description above focused on providing authorization to all expression information, in some embodiments there may be different consent levels associated with the expression information. For example, certain expression information (e.g., hand positions and/o orientation) may be assigned a first consent level. As another example, certain other expression information (e.g., phoneme weights) may be assigned a second consent level. Thus, the user may allow for client application A 1010A to use expression information assigned the first consent level but not the second consent level. While two consent levels are described, more consent levels may be assigned. Additionally, the user may assign his/her own consent levels to different expression information.

Example Inference Models

Figure 11:
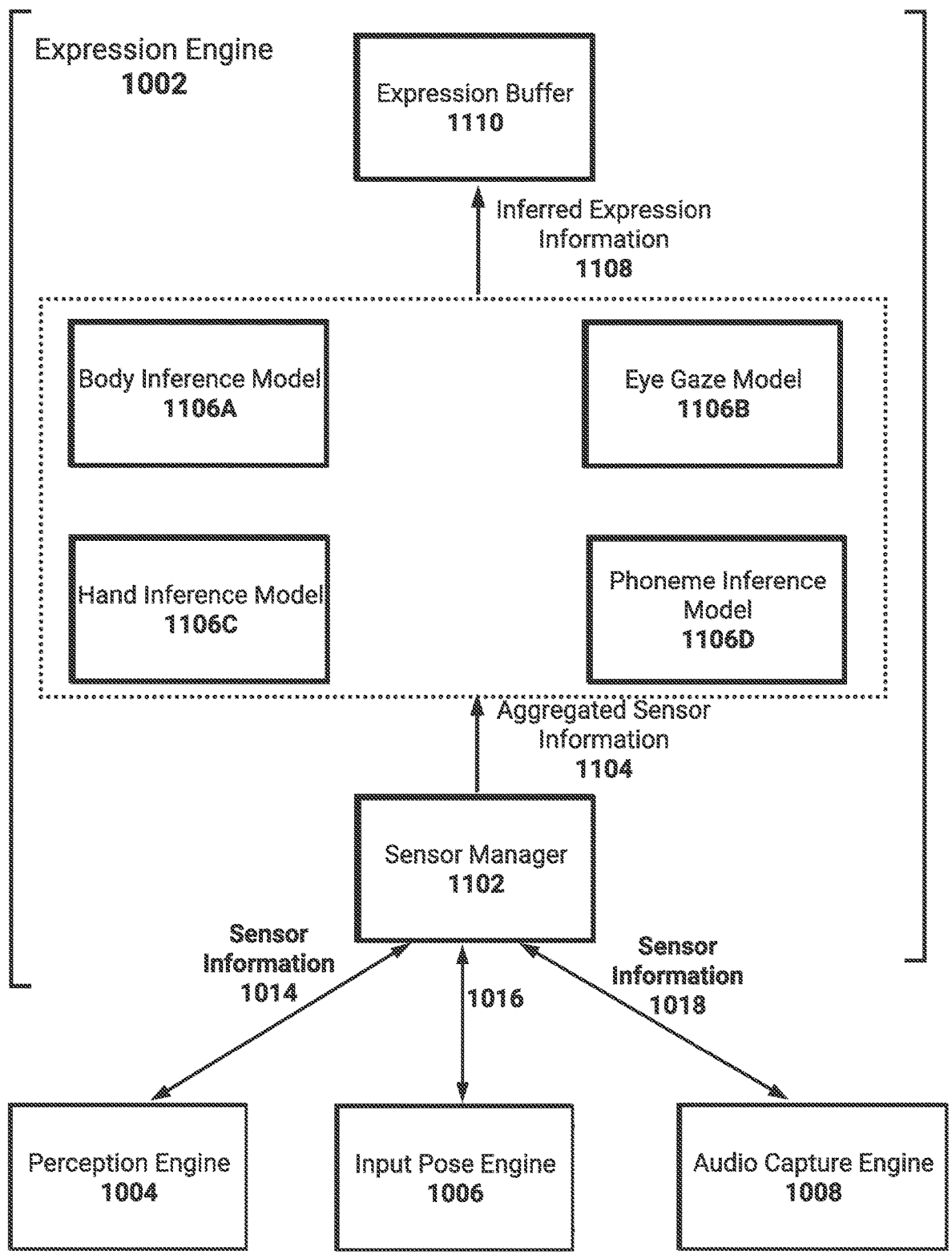
FIG. 11 illustrates a detailed block diagram of the example expression engine receiving sensor information.

FIG. 11 illustrates a detailed block diagram of the example expression engine 1002 receiving sensor information 1014-1018. As described above, the sensor information 1014-1018 may be obtained by different engines 1004-1008. Each engine may obtain information from certain sensors (e.g., a subset of the sensors or all of the sensors). Thus, audio capture engine 1008 may obtain information from one or more microphones of the wearable system. Additionally, input pose engine 1006 may obtain images which may include the user's hands. Input pose engine 1006 may also obtain information from one or more input devices being held by the user.

The above-described sensor information 1014-1018 may be received by a sensor manager 1102, which may generate aggregated sensor information 1104. This aggregated sensor information 1104 may be routed to different inference models 1106A-1106D of the expression engine 1002. Each inference model may infer information for inclusion in expression information.

As an example, a body inference model 1106A is illustrated in FIG. 11. This inference model 1106A may obtain information associated with a user's head pose (e.g., from inertial measurement units and/or images of the head). The inference model 1106A may then infer position and/or orientation of portions of the user's body. For example, the inference model may indicate a particular head pose of the user. The inference model 1106A may also determine a position and/or orientation of the user's pelvis. By way of example, the pelvis may be determined using a spring damper model. In this example, the spring damper model may connect the head and pelvis position. Thus, if the head moves the model 1106A may assume the pelvis lags behind. Additional techniques to determine pelvis may be employed and fall within the scope of the disclosure herein. For example, heuristics may be used to estimate head pose as a moving average for the pelvis.

As another example, an eye gaze model 1106B may be used to track the eyes of the user. In this example, eye gaze fixation may be determined (e.g., a three-dimensional real-world location at which the user's eyes are fixating). This may be used, for example, to determine movement of the user's eyes optionally along with animation of an avatar's pupils. The eye gaze model 1106B may additionally determine eyelid openness, whether the user is winking, and so on. The eye gaze model 1106B may use images of the user's eyes as obtained from imaging sensors of the wearable system. In some embodiments, the eye gaze model 1106B may filter information to ensure that determined information is physically possible. As an example, the model 1106B may discard values for eye-lid openness which are outside of the range of openness which correspond to normal (e.g., average) human eyelids.

With respect to the eye gaze model 1106B, in some embodiments the expression engine 1002 may opportunistically leverage eye gaze tracking performed by other platform or system level processes. For example, determine fixation point may be used to inform placement of virtual content. In this example, the virtual content may be rendered with some accommodation or vergence depth cues corresponding to the fixation point. Thus, the eye gaze model 1106B may optionally leverage this already-being determined eye gaze tracking. The model 1106B may perform filtering of this information, for example by computing moving averages.

As another example, a hand inference model 1106C may be used to track the hands of the user. This model 1106C may infer position, orientation, finger pose, and so on of each hand (e.g., left hand, right hand). For example, the model 1106C may fuse information from imaging sensors used for hand-tracking and input devices being held by the user. With respect to the imaging sensors, the model 1106C may use key-point tracking of portions of the user's hands. Certain positions of the user's hands may not be visible to imaging sensors of the wearable system (e.g., outward facing sensors). For these positions, the model 1106C may infer an expected position from last known positions of the hands. The model 1106C may also assign a neutral position for the user's hands. Additionally, if the user's hands are not visible but one hand is holding an input device, the model 1106C may obtain sensor information from the input device. For example, orientation of the hands may be derived from sensors in the input device.

As another example, a phoneme inference model 1106D may be used to determine information indicative of mouth movements. For example, the phoneme inference model 1106D may generate phoneme weights based on analyzing speech provided by the user (e.g., analyzing audio samples). In this example, deep learning techniques may be employed to generate phoneme weights. As another example, statistical or clustering techniques may be used to generate the phoneme weights. For example, there may be a threshold number of phonemes (e.g., 3,5, and so on) with weights being assigned values between 0 and 1. These phoneme weights may be used by client applications to generate mouth movements.

In this way, the inference models 1106A-1106D may generate inferred expression information 1108. Examples of this expression information 1108 are included above, and may at least include blend shapes, position and orientation information, Boolean values (e.g., is each hand or other body part visible), eye tracking information, audio information, and so on.

The inferred expression information 1108 may then be stored in an expression buffer 1110 for consumption by different client applications. As will be described in FIG. 12 below, the expression buffer may store expression information 1108 with associated timestamps of generation. In some embodiments, the client applications may access timestamps which are prior to a present time (e.g., delay buffering may be implemented). Additionally, in some embodiments the client applications may interpolate information between timestamps to generate smooth animation.

Example Expression Buffer

Figure 12:
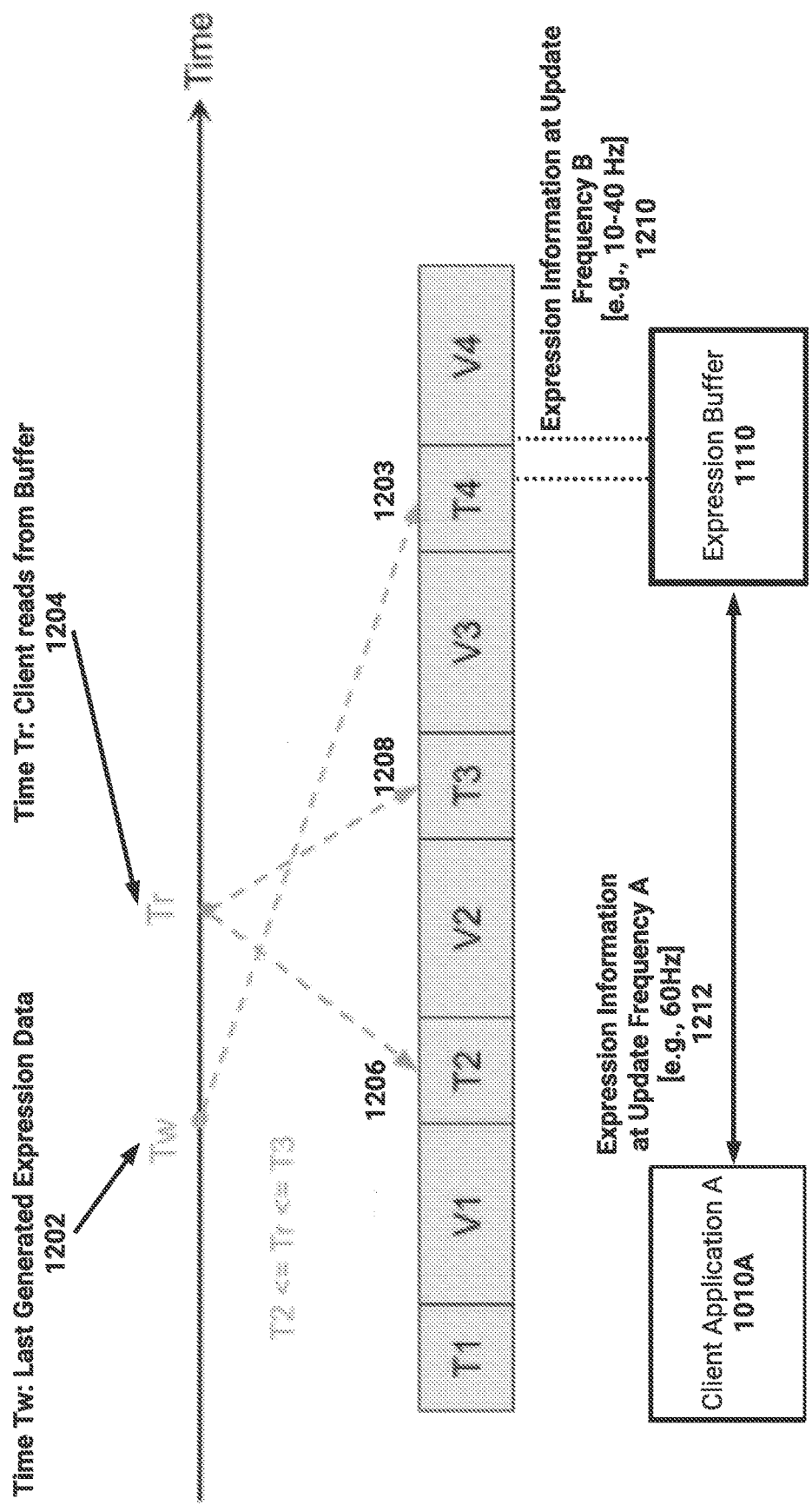
FIG. 12 illustrates a block diagram of an expression buffer usable to enhance animation of an avatar.

FIG. 12 illustrates a block diagram of an expression buffer 1110 usable to enhance animation of an avatar. In the illustrated embodiment, client application A 1010A is illustrated as receiving expression information at update frequency A. For example, update frequency A may be 60 Hz, 75 Hz, 90 Hz, and so on. In this example, the update frequency A may be set such that the client application A can generate smooth animation of an avatar. In contrast, the expression buffer 1110 may update its buffer at update frequency B. This update frequency B may be lower, such as 10 Hz, 20 Hz, 40 Hz, and so on. In some embodiments, the update frequency B may be adjusted in substantially real-time depending on available computational resources of the wearable system. For example, determining expression information may require substantial computational resources. Thus, it may be advantageous to reduce a processing burden associated with the expression information. Advantageously, the expression buffer 1110 may enable such reductions.

As illustrated, the expression buffer 1110 includes values for expression information at respective timestamps based on update frequency B. As an example, timestamp 'T2' 1206 has associated values 'V2'. As another example, timestamp 'T3' 1208 has associated values 'V3'. The difference in T2 and T3 may be 0.1 seconds, 0.025 seconds, and so on (depending on the update frequency B of the sensor information). In some embodiments, the expression buffer 1110 may store a threshold number of values (e.g., 4 values, 8, values, and so on).

The expression buffer 1110 may assign a delay to each of the timestamps (e.g., T2 1206) from times at which associated values were generated. For example, the last generated expression data 1202 was generated at time Tw. When writing this expression data 1202 to the expression buffer 1110, the data may be assigned timestamp T4 1203. A delay may be added to time Tw to arrive at timestamp T4 1203. For example, T4 may be defined as Tw+Delay. An example delay may be 30 ms, 60 ms, 100 ms, and so on.

Thus, when the client application A 1010A obtains expression information 1202 at a particular time, it obtains older expression information. For example, if the current time is time 'TR' 1204, then the client application A 1010A will obtain information which is older than the last generated expression data 1202. Additionally, since client application A 1010A is sampling the expression buffer 1110 at update frequency A, it may sample at times which do not directly correspond to timestamps included in the expression buffer 1110.

In the illustrated embodiment, the client application A 1010A has sampled at time Tr 1204, which is between timestamps T2 1206 and T3 1208. In some embodiments, interpolation between values V2 and V3 may be performed. For example, client application A 1010 or expression engine 1002 may compute values 'V' for time Tr 1204 as:

$$V = interp(V2, V3, t),$$

$$\text{where } t = \frac{(Tr - T2)}{T3 - T2}$$

The interpolation techniques may be selected based on type of expression information. For example, three-dimensional position information and floating-point scalars may be interpolated linearly. In contrast, spherical linear interpolation may be performed for three-dimensional orientation information. In some embodiments, phoneme weights may be interpreted according to moving averages, deep learning techniques, and so on.

Interpolation of the expression buffer 1110 may therefore allow for smooth animation while the added delay may prevent the buffer from overflowing (e.g., the client sampling time may not exceed the timestamp of the most recent value).

Example Expression Service Process

Figure 13:
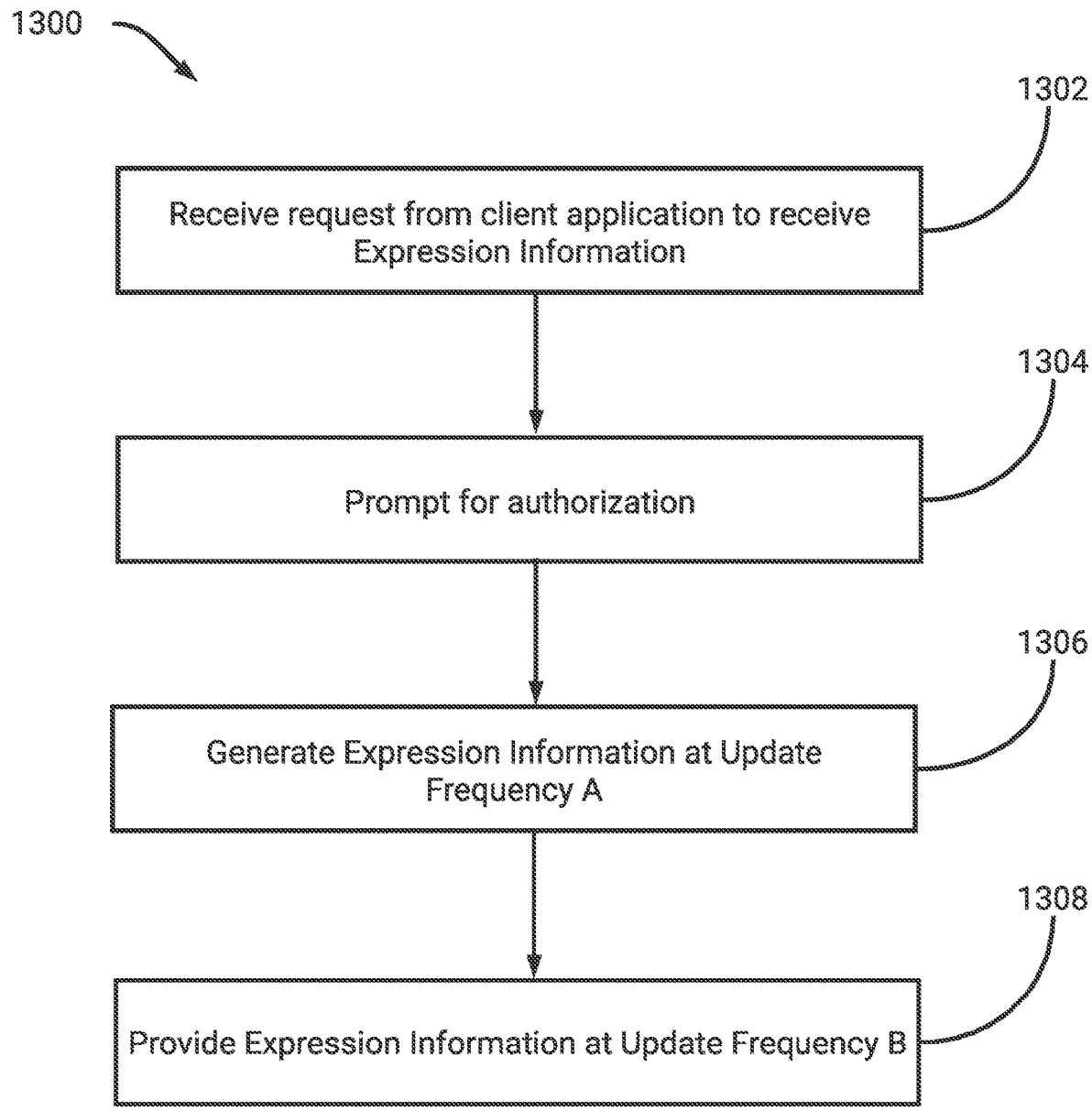
FIG. 13 illustrates a flowchart of an example process for providing expression information to a client application.

FIG. 13 illustrates a flowchart of an example process 1300 for providing expression information to a client application. For convenience, the process 1300 will be described as being performed by a wearable system including one or more processors (e.g., the display system 60).

At block 1302, the wearable system receives a request from a client application to receive expression information. As described above, for example in FIG. 10B, the client application may be configured to render an avatar for presentation to a user. The client application may leverage an application programming interface (API) call to request expression information. In some embodiments, the wearable system may already be generating expression information. For example, a different client application may have already subscribed to expression information. In some embodiments, if no client application is presently subscribed to expression information the wearable system may forego generating the information.

At block 1304, the wearable system prompts the user for authorization. An example dialog prompt is illustrated in FIG. 10B and described above. The user of the wearable system may indicate consent for the application to receive some or all of the expression information that is made available by the expression service.

At block 1306, the wearable system generates expression information at update frequency A. As described in FIG. 12, the expression service may generate updates to expression information at a fixed or a variable frequency (e.g., 10 Hz, 20 Hz, 40 Hz, or more). This update frequency may be set to ensure that the wearable system can adequately service other processes executing on the system.

At block 1308, the expression service provides expression information at update frequency B. As described in FIG. 12, the client application may sample the expression information at a frequency different than is generated by the expression service (e.g., at a higher or lower frequency). To ensure that animation of the avatar is smooth, the client application or wearable system may interpolate values generated at update frequency A.

In this way, the client application may effectuate rendering of the avatar in a rapid way while preserving privacy of the user and reducing computation requirements. Since the expression information is being generated by a system or platform level process, it may be generated without, or with limited, concern for which application is in focus to a user. For example, typically operating systems may limit an extent to which out of focus applications are able to effectuate processing. Thus, if each application had to process its own sensor information, then only an active (e.g., in focus) application would be likely to be allowed the processing. Other applications may therefore have unpredictable or disadvantageous behavior when not in focus.

Other Embodiments

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the virtual content disclosed herein may also be displayed by systems that provide images on a single depth plane.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

In addition, it will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims.

Accordingly, the claims are not intended to be limited to the embodiments shown herein, but are to be accorded the widest scope consistent with this disclosure, the principles and the novel features disclosed herein.

What is claimed is:

1. A computer-implemented method implemented by an augmented reality or a virtual reality wearable system, comprising:
   receiving, by an expression manager configured to communicate expression information to at least one client application, a request from the at least one client application for access to the expression information, wherein the expression information is generated at a first update frequency, wherein the at least one client application obtains the expression information at a second update frequency, wherein the first update frequency is less than the second update frequency, wherein the expression information reflects information derived from one or more sensors of the wearable system, and wherein the at least one client application is configured to present, via the wearable system, virtual content based on the expression information;
   outputting, for presentation, a user interface requesting user authorization from a user for the at least one client application to access the expression information; and
   in response to receiving user input indicating user authorization, enabling access to the expression information, wherein the virtual content is rendered based on the expression information.

2. The computer-implemented method of claim 1, wherein periodic updates to the expression information are obtained by the at least one client application.

3. The computer-implemented method of claim 2, wherein the at least one client application comprises a plurality of client applications.

4. The computer-implemented method of claim 3, wherein each at least one client application of the plurality of client applications obtains, as obtained expression information, periodic updates from the expression manager.

5. The computer-implemented method of claim 4, wherein the virtual content comprises an avatar rendered by the at least one client application based on the expression information and the periodic updates.

6. The computer-implemented method of claim 5, wherein the expression information is configured to be mapped to rig controls of the avatar.

7. The computer-implemented method of claim 5, wherein portions of the avatar are highlighted and a textual description of associated expression information is presented.

8. The computer-implemented method of claim 1, wherein the expression information is generated using a plurality of inference models, and wherein each inference model derives expression information from a respective subset of the one or more sensors.

9. The computer-implemented method of claim 8, wherein a first inference model of the plurality of inference models derives a pose associated with a head of the user, and wherein the first inference model further derives position and orientation of a root of the user based on the pose.

10. The computer-implemented method of claim 8, wherein a second inference model of the plurality of inference models derives a fixation point and expression information indicating eyelid openness of the user, and wherein the fixation point indicates a three-dimensional location within a real-world at which the user is fixating.

11. The computer-implemented method of claim 8, wherein a third inference model of the plurality of inference models derives position and orientation of one or more user hands.

12. The computer-implemented method of claim 8, wherein a fourth inference model of the plurality of inference models derives phoneme information associated with speech of the user.

13. The computer-implemented method of claim 1, wherein access to the expression information by the at least one client application is constrained until receipt of user authorization, and wherein no access to information from the sensors is granted to the at least one client application.

14. The computer-implemented method of claim 1, wherein the expression information reflects one or more of blend shapes, phoneme weights, hand position and orientation information, eye-lid openness, fixation point, hand pose information, audio amplitude associated with speech from the user.

15. The computer-implemented method of claim 1, wherein an expression buffer of the wearable system stores respective values of expression information generated at a threshold number of timestamps, wherein the at least one client application obtains values of expression information at a particular timestamp, and wherein obtaining values comprises:
- identifying a first timestamp of the threshold number of timestamps which is earlier than the particular timestamp;
- identifying a second timestamp of the threshold number of timestamps which is later than the particular timestamp; and
- interpolating between values of the first timestamp and second timestamp.

16. The computer-implemented method of claim 15, wherein the expression buffer is a delay buffer, such that for values of expression information generated at a first timestamp, the values of expression information are stored in the expression buffer as being associated with the first timestamp plus a delay.

17. The computer-implemented method of claim 1, wherein enabling access comprises:
- registering the at least one client application with the expression manager configured to output the expression information, wherein the at least one client application subscribes to updates from the expression manager.

18. A non-transitory, computer-readable medium of an augmented reality or a virtual reality wearable system storing one or more instructions executable by a computer system to perform operations comprising:
- receiving, by an expression manager configured to communicate expression information to at least one client application, a request from the at least one client application for access to the expression information, the expression information reflecting information derived from one or more sensors of the wearable system, wherein the expression information is generated using a plurality of inference models, wherein each inference model of the plurality of inference models derives expression information from a respective subset of the one or more sensors, wherein a first inference model of the plurality of inference models derives a pose associated with a head of a user, wherein the first inference model further derives position and orientation of a root of the user based on the pose, and wherein the at least one client application is configured to present, via the wearable system, virtual content based on the expression information;
- outputting, for presentation, a user interface requesting user authorization from the user for the client application to access the expression information; and
- in response to receiving user input indicating user authorization, enabling access to the expression information, wherein the virtual content is rendered based on the expression information.

19. A computer-implemented augmented reality or a virtual reality wearable system, comprising:
- one or more processors; and
- one or more computer memory devices interoperably coupled with the one or more processors and having tangible, non-transitory, machine-readable media storing one or more instructions that, when executed by the one or more processors, perform one or more operations comprising:
  - receiving, by an expression manager configured to communicate expression information to at least one client application, a request from the at least one client application for access to the expression information, wherein the expression information is generated at a first update frequency, wherein the at least one client application obtains the expression information at a second update frequency, wherein the first update frequency is less than the second update frequency, wherein the expression information reflects information derived from one or more sensors of the wearable system, and wherein the at least one client application is configured to present, via the wearable system, virtual content based on the expression information;
  - outputting, for presentation, a user interface requesting user authorization from a user for the client application to access the expression information; and
  - in response to receiving user input indicating user authorization, enabling access to the expression information, wherein the virtual content is rendered based on the expression information.

* * * * *